(12) United States Patent
Ou et al.

(10) Patent No.: US 10,409,065 B2
(45) Date of Patent: Sep. 10, 2019

(54) NEAR-EYE DISPLAY

(71) Applicant: Huawei Technologies Co., Ltd., Shenzhen (CN)

(72) Inventors: Jian Ou, Shenzhen (CN); Pan Long, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 15/641,993

(22) Filed: Jul. 5, 2017

(65) Prior Publication Data

US 2017/0299872 A1 Oct. 19, 2017

Related U.S. Application Data

(63) Continuation of application No. PCT/CN2015/095708, filed on Nov. 26, 2015.

(30) Foreign Application Priority Data

Jan. 6, 2015 (CN) .......................... 2015 1 0007318

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0833* (2013.01); *G02B 27/0093* (2013.01);
(Continued)

(58) Field of Classification Search
CPC ........ G02B 27/0172; G02B 2027/0178; G02B 27/0093; G02B 27/017; G02B 2027/014; G02B 2027/0123; G02B 2027/0127
(Continued)

(56) References Cited

U.S. PATENT DOCUMENTS 6,657,763 B2 12/2003 Kobayashi
8,503,087 B1 * 8/2013 Amirparviz .............. G02B 5/09
359/630

(Continued)

FOREIGN PATENT DOCUMENTS

CN 1892271 A 1/2007
CN 101750738 A 6/2010
(Continued)

*Primary Examiner* — Koosha Sharifi-Tafreshi
(74) *Attorney, Agent, or Firm* — Slater Matsil, LLP

(57) ABSTRACT

A near-eye display device is disclosed that includes a pixel display configured to display multiple groups of pixels, in each frame of image, that are output by scanning. The device includes multiple semi-reflectors, where each semi-reflector is in a one-to-one correspondence with each group of pixels displayed by the pixel display unit. Each semi-reflector includes multiple inner platings that are disposed at different reflection angles. Each of the inner platings is in a one-to-one correspondence with each pixel subunits that is in a group of pixels corresponding to a semi-reflector in which the inner plating is located. Each semi-reflector is configured to be activated when the group of pixels corresponding to the semi-reflector is reflected, and reflect each pixel subunit which is in a one-to-one correspondence with each of the inner platings to a direction of an eyeball center by using all the inner platings included in the semi-reflector.

20 Claims, 13 Drawing Sheets

(51) Int. Cl.
  *G02B 27/00* (2006.01)
  *G02B 27/14* (2006.01)
(52) U.S. Cl.
  CPC .... *G02B 27/144* (2013.01); *G02B 2027/0123* (2013.01); *G02B 2027/0178* (2013.01); *G02B 2027/0187* (2013.01)
(58) Field of Classification Search
  USPC .......................................................... 345/8
  See application file for complete search history.

(56) References Cited

U.S. PATENT DOCUMENTS

| | | | |
|---|---|---|---|
| 2003/0184664 A1 | 10/2003 | Iwasaki | |
| 2006/0291021 A1 | 12/2006 | Mukawa | |
| 2010/0149073 A1* | 6/2010 | Chaum | G02B 27/0093 345/8 |
| 2010/0157433 A1 | 6/2010 | Mukawa et al. | |
| 2011/0013245 A1 | 1/2011 | Tanaka et al. | |
| 2013/0100362 A1 | 4/2013 | Saeedi et al. | |
| 2013/0285885 A1 | 10/2013 | Nowatzyk et al. | |
| 2014/0285429 A1 | 9/2014 | Simmons | |
| 2016/0154243 A1* | 6/2016 | Aiki | G02B 17/00 359/633 |
| 2018/0149869 A1* | 5/2018 | Bergquist | G02B 27/147 |

FOREIGN PATENT DOCUMENTS

| | | |
|---|---|---|
| CN | 101846799 A | 9/2010 |
| CN | 101957500 A | 1/2011 |
| CN | 103890637 A | 6/2014 |
| CN | 104246578 A | 12/2014 |
| CN | 104570352 A | 4/2015 |
| JP | 2000111827 A | 4/2000 |
| WO | 2014209244 A1 | 12/2014 |

* cited by examiner

NEAR-EYE DISPLAY

CROSS-REFERENCE TO RELATED APPLICATIONS

This application is a continuation of International Application No. PCT/CN2015/095708, filed on Nov. 26, 2015, which claims priority to Chinese Patent Application No. 201510007318.7, filed on Jan. 6, 2015. The disclosures of the aforementioned applications are hereby incorporated by reference in their entireties.

TECHNICAL FIELD

The present invention relates to the field of displays, and in particular, to a near-eye display.

BACKGROUND

A near-eye display is a type of display device, and is generally made in a shape of a wearable device (for example, made in a form of glasses or a head mounted device). By means of the near-eye display, display may be implemented within a distance of 1 cm to 5 cm away from eyes, and may further overlap with a live view.

By using Google Glass, which is a relatively typical near-eye display at present, as an example, a principle of the Google Glass is projecting an image onto a prism by using a projector, and reflecting the projected image onto an eye of a user by using a spectroscope built in the prism.

Although the Google Glass implements display of an image, the Google Glass cannot achieve a depth of field effect of the image desirably, thereby affecting user experience.

SUMMARY

To resolve a problem in the prior art that a depth of field effect of an image cannot be achieved desirably, embodiments of the present invention provide a near-eye display device, specifically:

According to a first aspect, an embodiment of the present invention provides a near-eye display device that includes a pixel display configured to display multiple groups of pixels, in each frame of image, that are output by scanning. Each group of pixels includes multiple pixel subunits, and each pixel subunit includes at least one pixel. The device further includes multiple semi-reflectors, where each of the semi-reflectors is in a one-to-one correspondence with each group of pixels displayed by the pixel display. Each semi-reflector includes multiple inner platings that are disposed at different reflection angles. Each of the inner platings is in a one-to-one correspondence with each pixel subunits that is in a group of pixels corresponding to a semi-reflector in which the inner plating is located. Each of the semi-reflectors is configured to be activated when the group of pixels corresponding to the semi-reflector needs to be reflected, and reflect each pixel subunit which is in a one-to-one correspondence with each of the inner platings to a direction of an eyeball center by using all the inner platings included in the semi-reflector.

In a first possible implementation manner of the first aspect, an angle of a light ray that is projected by the multiple semi-reflectors onto a human eye covers an entire area, in which a light ray can be received, of an eyeball, and a horizontal angle and a pitch angle that are formed by the light ray projected onto the human eye are respectively greater than or equal to a maximum horizontal angle and a maximum pitch angle that are of a field of view of the human eye.

With reference to the first aspect or the first possible implementation manner of the first aspect, in a second possible implementation manner, the pixel display includes a first side pixel display and a second side pixel display. The first side pixel display is configured to display multiple groups of pixels, in each frame of image, that are output by scanning and that are located on a first side of the image. The second side pixel display is configured to display multiple groups of pixels, in each frame of image, that are output by scanning and that are located on a second side of the image, and in each frame of image. The multiple groups of pixels located on the first side of the image and the multiple groups of pixels located on the second side of the image constitute a frame of image. The multiple semi-reflectors include multiple first side semi-reflectors and multiple second side semi-reflectors, where the multiple first side semi-reflectors separately correspond to the multiple groups of pixels displayed by the first side pixel display, and the multiple second side semi-reflectors separately correspond to the multiple groups of pixels displayed by the second side pixel display. The display further includes: a reflecting prism configured to reflect a group of pixels displayed by the second side display. Each semi-reflector of the multiple first side semi-reflectors is configured to be activated when a group of pixels displayed by the first side pixel display needs to be reflected, and reflect the group of displayed pixels onto the eye by using the inner platings after each semi-reflector of the multiple first side semi-reflectors is activated; and each semi-reflector of the multiple second side semi-reflectors is configured to be activated when a group of pixels displayed by the second side pixel display needs to be reflected, and reflect, to the direction of the eyeball center by using the inner platings after each semi-reflector of the multiple second side semi-reflectors is activated, the group of pixels that is displayed by the second side pixel display and that is reflected through the reflecting prism.

With reference to the second possible implementation manner of the first aspect, in a third possible implementation manner, the first side pixel display is a left side pixel display, and the second side pixel display is a right side pixel display; when the first side pixel display is configured to display the multiple groups of pixels, in each frame of image, that are output by means of scanning and that are located on the first side of the image, the first side pixel display is specifically configured to display the multiple groups of pixels, in each frame of image, that are output by means of column scanning and that are located on a left side of the image; and when the second side pixel display is configured to display the multiple groups of pixels, in each frame of image, that are output by means of scanning and that are located on the second side of the image, the second side pixel display is specifically configured to display the multiple groups of pixels, in each frame of image, that are output by means of column scanning and that are located on a right side of the image.

With reference to the first aspect or any one of the first to third possible implementation manners of the first aspect, in a fourth possible implementation manner, the pixel display outputs the multiple groups of pixels in each frame of image by means of column scanning, and each group of pixels is one or more columns of pixels; when each group of pixels is a column of pixels, a quantity of the inner platings in each semi-reflector is equal to a quantity of pixels in the column of pixels, and each inner plating separately corresponds to each pixel in the column of pixels; or when each group of pixels is multiple columns of pixels, a quantity of the inner platings in each semi-reflector is equal to a quantity of pixels in one column of pixels, and each inner plating separately corresponds to multiple pixels in each row in the multiple columns of pixels; or when each group of pixels is multiple columns of pixels, a quantity of the inner platings in each semi-reflector is equal to a quantity of pixels in the multiple columns of pixels, and each inner plating is in a one-to-one correspondence with each pixel of the multiple columns of pixels.

With reference to the first aspect or any one of the first to fourth possible implementation manners of the first aspect, in a fifth possible implementation manner, each semi-reflector, of the multiple semi-reflectors, that is at an inactive position does not block light emitted to an activated semi-reflector.

With reference to the first aspect or any one of the first to fifth possible implementation manners of the first aspect, in a sixth possible implementation manner, the semi-reflector is substantially in a shape of a long strip, and the multiple inner platings are arranged along a length direction of the long strip.

With reference to the sixth possible implementation manner of the first aspect, in a seventh possible implementation manner, the semi-reflector is in a shape of a long strip and thin plate, when each semi-reflector of the multiple semi-reflectors is inactive, the semi-reflector and another semi-reflector are arranged in a manner of aligning long edges to form a first plane, and the first plane is parallel with a plane constituted by light rays that are formed by a group of pixels displayed by the pixel display unit.

With reference to the seventh possible implementation manner of the first aspect, in an eighth possible implementation manner, when glasses are normally worn, a plane on which a lens of the glasses is located is equivalent to a rectangular plane perpendicular to a horizontal plane, where the rectangular plane includes two long edges and two short edges, a long edge of the lens of the glasses is considered as an x-axis, a short edge of the lens of the glasses is considered as a y-axis, and a line that is perpendicular to an xy plane constituted by the x-axis and the y-axis is a z-axis; and the first plane is parallel with the plane formed by the x-axis and the y-axis.

With reference to any one of the sixth to eighth possible implementation manners of the first aspect, in a ninth possible implementation manner, in an active state, the activated semi-reflector flips by a particular angle by using a long edge of the long strip as an axis.

With reference to the sixth possible implementation manner of the first aspect, in a tenth possible implementation manner, the semi-reflector is in a shape of a long strip and thin plate, when each semi-reflector of the multiple reflectors is inactive, the semi-reflector and another semi-reflector are stacked in a thickness direction to form a cube, and a second plane formed by the cube in the thickness direction is parallel with a plane constituted by light rays that are formed by a group of pixels displayed by the pixel display unit.

With reference to the tenth possible implementation manner of the first aspect, in an eleventh possible implementation manner, in an active state, the activated semi-reflector moves by a distance along a width direction of the long strip; when glasses are normally worn, a plane on which a lens of the glasses is located is equivalent to a rectangular plane perpendicular to a horizontal plane, where the rectangular plane includes two long edges and two short edges, a long edge of the lens of the glasses is considered as an x-axis, a short edge of the lens of the glasses is considered as a y-axis, and a line that is perpendicular to an xy plane constituted by the x-axis and the y-axis is a z-axis; and the second plane is parallel with the plane formed by the x-axis and the y-axis.

With reference to any one of the sixth possible implementation manner, and the tenth and eleventh possible implementation manners of the first aspect, in a twelfth possible implementation manner, in an active state, the activated semi-reflector moves by a distance along the width direction of the long strip.

With reference to the first aspect or any one of the first to twelfth possible implementation manners of the first aspect, in a thirteenth possible implementation manner, the near-eye display further includes a processor; the processor is configured to control the pixel display to output, by means of scanning, the multiple groups of pixels in each frame of image; and the processor is further configured to control the semi-reflector that corresponds to the group of pixels output by the pixel display to be activated.

With reference to the thirteenth possible implementation manner of the first aspect, in a fourteenth possible implementation manner, the near-eye display further includes a beam splitter and a photoreceptor array; the beam splitter is configured to reflect, onto the photoreceptor array, light reflected by the eyeball;

the photoreceptor array generates corresponding data according to the light reflected by the beam splitter and stores the data; and the processor is further configured to detect the eyeball according to the data stored in the photoreceptor array, and execute a corresponding operation action according to a detection result.

With reference to the first aspect or any one of the first to fourteenth possible implementation manners of the first aspect, in a fifteenth possible implementation manner, each frame of image is output by means of column scanning, and each group of pixels is in one column; and a quantity of the multiple semi-reflectors is equal to a quantity of columns of each frame of image.

With reference to the first aspect or any one of the first to fifteenth possible implementation manners of the first aspect, in a sixteenth possible implementation manner, each inner plating reflects light for only once.

With reference to the first aspect or any one of the first to sixteenth possible implementation manners of the first aspect, in a seventeenth possible implementation manner, the pixel display is specifically configured to display, in a manner of outputting parallel light, the multiple groups of pixels, in each frame of image, that are output by means of scanning.

The foregoing technical solutions have the following advantages:

In the embodiments of the present invention, when reflecting a group of pixels, each semi-reflector reflects, by using multiple inner platings, one or more pixels corresponding to each inner plating to a direction of an eyeball center. In this way, light rays reflected to the eyeball center are not parallel with each other, but are reflected onto the eyeball center at multiple angles, so that a depth of field effect is formed, and user experience is improved.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
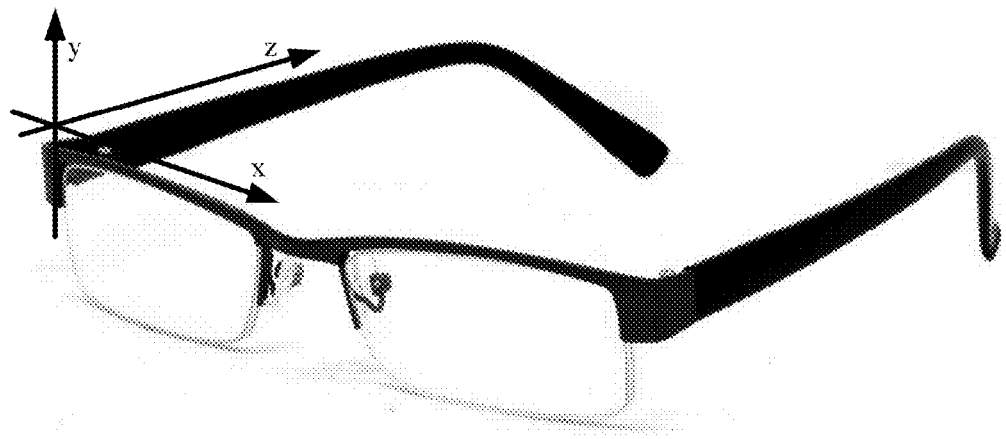
FIG. 1 is a schematic diagram of common glasses in the prior art.

A specific shape of a near-eye display involved in the present invention is essentially similar to a shape of glasses in FIG. 1, where the glasses include a component (such as lenses) for visual observation, a worn component (such as temples), and a mechanical part (such as a frame part except the temples) connecting these pails. In actual design, different components may be correspondingly improved, so as to enable display of an image. For example, a display processing device is added to improve a temple part as what is done for Google Glass. To exemplarily describe the subsequent accompanying drawings more conveniently, in FIG. 1, identification is performed based on a shape of ordinary glasses by using a coordinate axis. Specifically, refer to FIG. 1, which shows a three-dimensional position at which glasses are located when the glasses are worn normally. Because a lens has an arc at periphery in practice, the glasses also present a radian as a whole. For ease of description, a plane on which the lens is located is equivalent to a rectangular plane perpendicular to a horizontal plane. The rectangular plane includes two long edges and two short edges, which are respectively defined as an x-axis and a y-axis, and this rectangular plane may be defined as an xy plane. A direction in which a temple perpendicular to a plane of the lens is located is a z-axis, and for ease of exemplary description, a position of an origin is not limited in FIG. 1 and other accompanying drawings. A person skilled in the art may determine specific visual angles of the other accompanying drawings by using a schematic diagram of a coordinate system in FIG. 1 in combination with schematic diagrams of coordinate systems in the other accompanying drawings.

To make the objectives, technical solutions, and advantages of the present invention clearer and more comprehensible, the following further describes the present invention in detail by using specific embodiments and related accompanying drawings.

Embodiment 1

Figure 2:
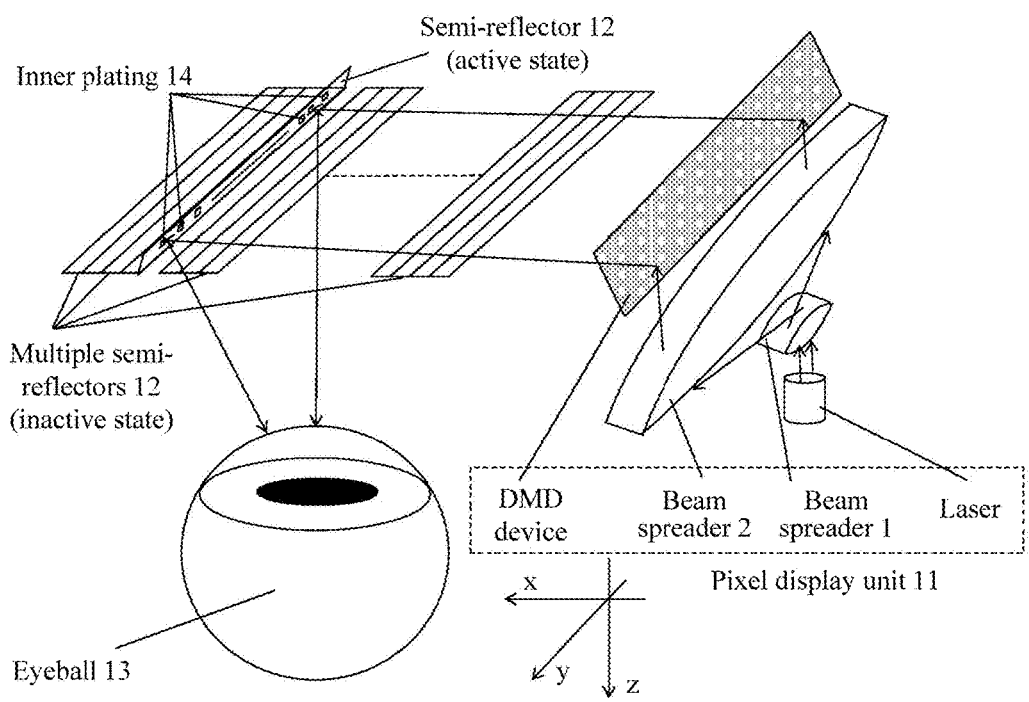
FIG. 2 is a schematic structural diagram of a near-eye display according to Embodiment 1 of the present invention.

Referring to FIG. 2, this embodiment of the present invention provides a near-eye display, including a pixel display unit 11, configured to display multiple groups of pixels, in each frame of image, that are output by means of scanning, where each group of pixels includes multiple pixel subunits, and each pixel subunit includes at least one pixel. For example, if each group of pixels is a column of 600 pixels, each pixel may be classified as one pixel subunit, and there are 600 pixel subunits in total, or some pixel subunits may include multiple (such as two) pixels, and the 600 pixels are classified as 590 or 580 or another similar quantity of pixel subunits; and multiple semi-reflectors 12, where each of the semi-reflectors is in a one-to-one correspondence with each group of pixels displayed by the pixel display unit, each semi-reflector includes multiple inner platings that are disposed at different reflection angles, each inner plating is in a one-to-one correspondence with each pixel subunits that is in a group of pixels corresponding to a semi-reflector in which the inner plating is located. Each of the semi-reflectors is configured to be activated when the group of pixels corresponding to the semi-reflector needs to be reflected, and reflect each pixel subunit which is in a one-to-one correspondence with each inner plating to a direction of an eyeball 13 center by using all the inner platings included in the semi-reflector.

In this embodiment of the present invention, when reflecting a group of pixels, each semi-reflector reflects, by using multiple inner platings, one or more pixels corresponding to each inner plating to a direction of an eyeball center. In this way, light rays reflected to the eyeball center are not parallel with each other, but are reflected onto the eyeball center at multiple angles, so that a depth of field effect is formed, and user experience is improved.

Embodiment 2

Based on the foregoing embodiment, a pixel display unit is specifically described in this embodiment of the present invention. In this embodiment of the present invention, a principle of displaying an image by the pixel display unit is consistent with that in the prior art. That is, a processor divides each frame of image into multiple groups of pixels by means of scanning and outputs the multiple groups of pixels to the pixel display unit, and the pixel display unit displays these group of pixels. It should be noted that in the embodiments of the present invention, for ease of description, "displaying/reflecting pixels" and "displaying/reflecting light of pixels (or displaying/reflecting light corresponding to pixels)" express a same meaning, and are not distinguished.

In this embodiment of the present invention, when pixels of a frame of image that needs to be displayed are grouped, for example, may be grouped by "row", where one or more rows are grouped into one group, or may be grouped by "column", where one or more columns are grouped into one group, or may be grouped in another self-defined manner, which is not limited herein. For example, display of a frame of image with a resolution of 800*600 is used as an example. A typical group of pixels may be a column of pixels including 600 pixels, or may be multiple columns of pixels including multiples of 600 pixels. If one group of pixels includes two columns of pixels, a corresponding pixel display unit may display two columns of pixels once. Correspondingly, each semi-reflector reflects two columns of pixels to a direction of an eyeball center once.

Specifically, the pixel display unit may be implemented in multiple manners. However, regardless of which manner is used, the manners have a consistent objective for displaying pixels of an image under the control of the processor, and effectively using a light source by means of parallel light (rather than by means of divergent light rays), so as to achieve a better display effect.

Specifically, the pixel display unit may include the following implementation manners.

(1) A DMD (Digital Micromirror Device) Digital Micromirror Device, a Laser, and a Lens Group Refer to FIG. 2, which is a schematic diagram of a pixel display unit implemented by using this solution. In this solution, the DMD device is connected to the processor (for example, a CPU), and is configured to receive and activate a group of pixels that needs to be displayed. The laser and the lens group are configured to provide a backlight for the DMD, so that the activated pixels can be displayed. The lens group includes a beam spreader 1 and a beam spreader 2 that are shown in the figure.

(2) A Liquid Crystal Projection Screen, a Laser, a Lens Group, and a Reflector

Figure 3:
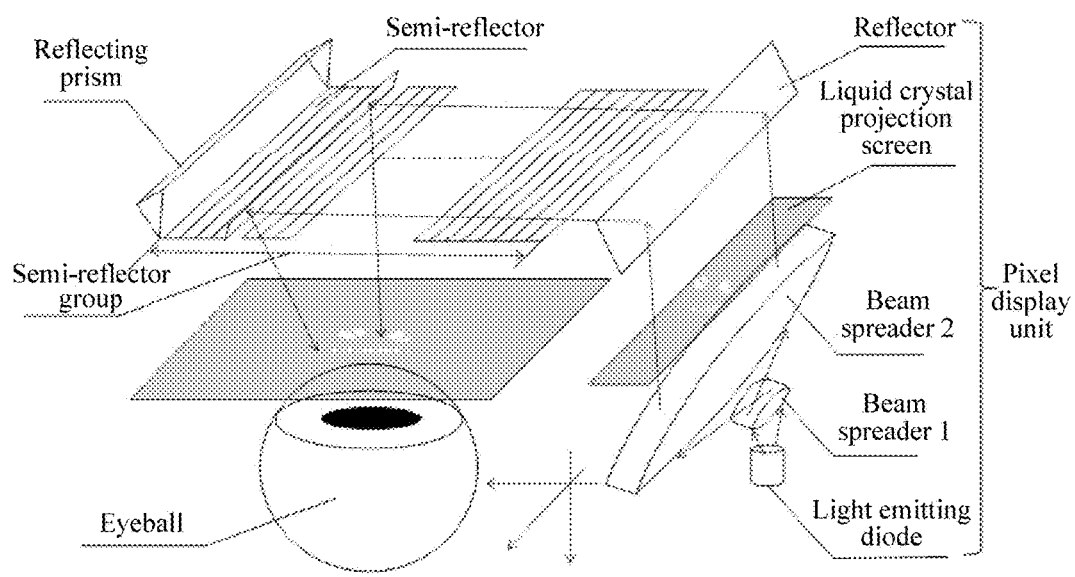
FIG. 3 is a schematic structural diagram of a pixel display unit according to Embodiment 2 of the present invention.

Refer to FIG. 3, which is a schematic diagram of a pixel display unit implemented by using this solution. In this solution, the liquid crystal projection screen is connected to the processor, and is configured to receive and activate a group of pixels that needs to be displayed. The laser and the lens group are configured to provide a backlight for the liquid crystal projection screen, so that the activated pixels can be displayed.

(3) A Light Emitting Diode Array, a Convex Lens Group, and a Reflector (Optional)

Figure 4:
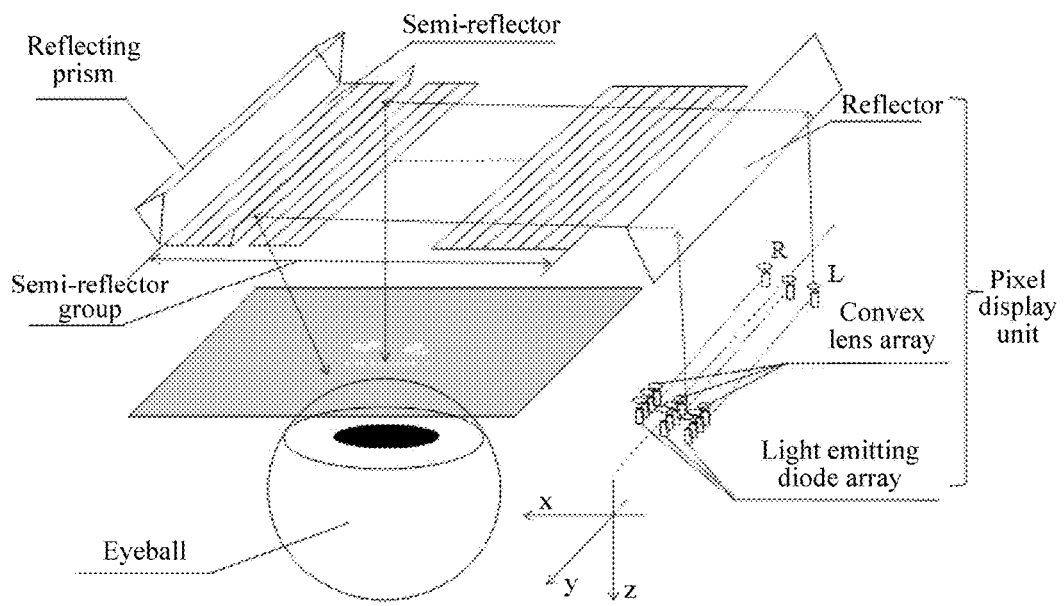
FIG. 4 is a schematic structural diagram of a pixel display unit according to Embodiment 2 of the present invention.
Figure 5:
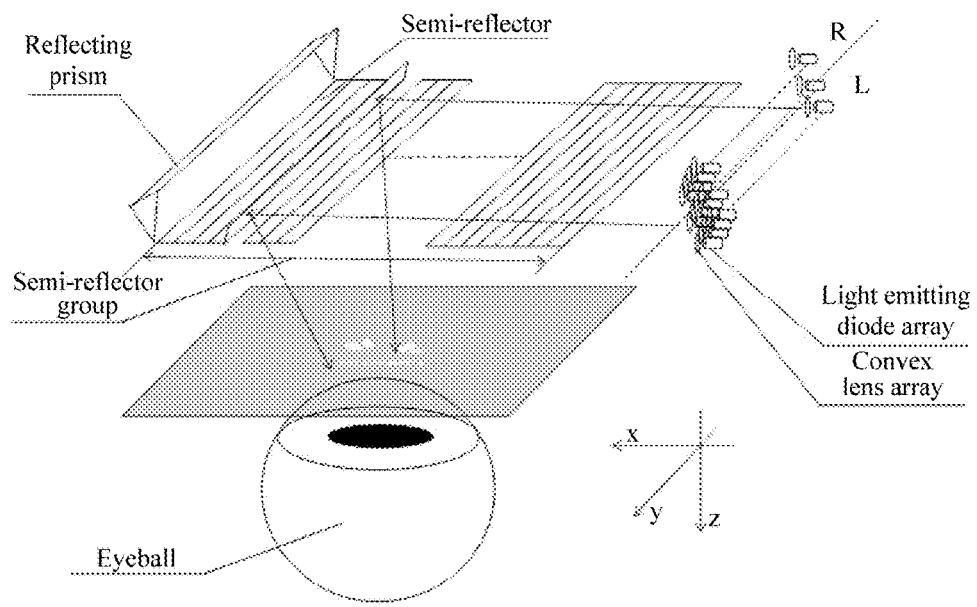
FIG. 5 is a schematic structural diagram of a pixel display unit according to Embodiment 2 of the present invention.

Refer to FIG. 4 and FIG. 5, which are schematic diagrams of a pixel display unit implemented by using this solution. In this solution, multiple light emitting diodes form one light emitting diode array, and a convex lens is disposed in front of each light emitting diode for converging light rays. Because the light emitting diode can display pixels without a backlight, no backlight needs to be provided herein. Therefore, a device, such as the laser or the lens group in the foregoing two manners, configured to provide a backlight may be omitted. In addition, because of a difference between placement positions of the light emitting diode array, one or more reflectors may be needed to reflect pixels that need to be displayed.

In this embodiment of the present invention, the pixel display unit may be placed on one side of a display. By using an example in which the display is in a most common form of glasses, the pixel display unit may be placed at a temple part of the glasses as what is done for Google Glass. Certainly, in another embodiment, the pixel display unit may also be placed at another position, which is not limited, for example, is placed at a position of a nose bridge in the middle of the glasses.

In addition, to implement a panoramic display function, the pixel display unit may be divided into two parts for display, where one part is configured to display multiple groups of pixels of a frame of image, and the other part is configured to display remaining multiple groups of pixels. For example, by using an example in which an image is output by means of column scanning, one part (a part marked with "L" in FIG. 4 and FIG. 5) of the pixel display unit is configured to display pixels related to a left half-frame of the image, and the other part (a part marked with "R" in FIG. 4 and FIG. 5) of the pixel display unit is configured to display pixels related to a right half-frame of the image, and panoramic display is implemented in cooperation with a reflecting prism and multiple semi-reflectors. For details, reference may be made to descriptions in Embodiment 4.

It should be noted that specific implementation of the foregoing several display manners all belongs to the prior art, and details are not described herein.

Embodiment 3

Based on the foregoing embodiments, specific implementation of multiple semi-reflectors (for ease of description, which are also briefly referred to as "a semi-reflector group") is described in this embodiment of the present invention.

In this embodiment of the present invention, preferably, each semi-reflector of the multiple semi-reflectors is in a one-to-one correspondence with each group of pixels of multiple groups of pixels output by a pixel display unit, that is, a quantity of the multiple semi-reflectors is the same as a quantity of groups of the multiple groups of pixels, and one semi-reflector corresponds to one group of pixels. For example, the pixel display unit is configured to display each frame of image with a resolution of 800*600. If each frame of image is divided into 800 groups of pixels (where each group of pixels is a column of pixels including 600 pixels) by means of column scanning for output, 800 semi-reflectors separately corresponding to the 800 groups of pixels may be disposed, and each semi-reflector is used to reflect a group of pixels (that is, a column of pixels) corresponding to the semi-reflector onto an eye of a user; or if each frame of image with a resolution of 800*600 is divided into 400 groups of pixels (where each group of pixels is two columns of pixels including 600 pixels) by means of column scanning, 400 semi-reflectors separately corresponding to the 400 groups of pixels may be disposed.

In practice, a quantity of groups of pixels into which each frame of image is divided and a quantity of corresponding semi-reflectors to be disposed may be comprehensively determined in combination with a resolution of a to-be-displayed image and a maximum quantity of semi-reflectors that can be allowed by a display. Specifically, because of a limitation on a size of the display, and a limitation on a manufacturing technique of the semi-reflectors, to a limited extent, only a quantity of semi-reflectors whose quantity is "a theoretical maximum value" may be contained. In this case, by using the column scanning as an example, if a to-be-displayed image has a high resolution, and each single column of pixels is classified as one group, a quantity of corresponding semi-reflectors may exceed the theoretical maximum value. In this case, several columns of pixels may be classified as one group, so as to reduce a quantity of groups, and correspondingly, the quantity of the semi-reflectors is also reduced (certainly, a quantity of pixels reflected by each semi-reflector needs to be increased correspondingly).

In this embodiment of the present invention, a near-eye display may be made in a form similar to that of ordinary glasses. In this case, the near-eye display is approximately 1 cm (for example, at a position at which a lens is located when the near-eye display is glasses) away from a surface of a human eyeball, and a visible range of a human eye is approximately a rectangular area with a width of 5 cm and a height of 4 cm. If the width of 5 cm is used for calculation, and if a 4K high-definition image with a resolution of 4096*2160 needs to be displayed, during column scanning, a preferred manner is that each column of pixels corresponds to one semi-reflector; in this case, a total of 4096 semi-reflectors are needed, and a width of each semi-reflector is approximately equal to 12 microns, which is obtained by dividing 5 cm by 4096. The semi-reflector of such order of magnitude can be manufactured by using a conventional technique. If an image with a lower resolution is to be displayed, a technique requirement is also lower.

Preferably, the multiple semi-reflectors may separately correspond to the output multiple groups of pixels sequentially, that is, the first semi-reflector of the multiple semi-reflectors that are sequentially arranged corresponds to the first group of pixels of the multiple groups of pixels that are sequentially arranged, the second semi-reflector of the multiple semi-reflectors corresponds to the second group of pixels of the multiple groups of pixels, . . . , and so on. Certainly, in another embodiment, the multiple semi-reflectors may not separately correspond to the multiple groups of output pixels sequentially. For example, the first semi-reflector of the multiple semi-reflectors that are sequentially arranged corresponds to the second group of pixels of the multiple groups of pixels that are sequentially arranged, the second semi-reflector of the multiple semi-reflectors corresponds to the first group of pixels of the multiple groups of pixels, or another correspondence manner in which an objective of reflecting the multiple groups of pixels that are output by the pixel display unit by means of scanning can be achieved is used.

Figure 6:
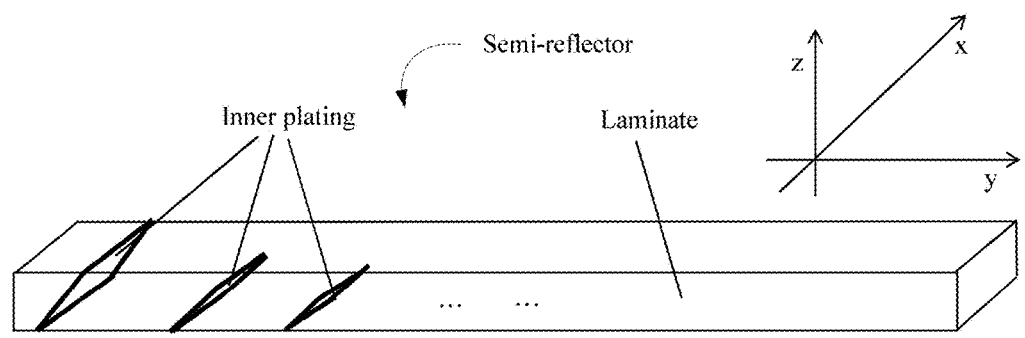
FIG. 6 is a schematic structural diagram of a semi-reflector according to Embodiment 3 of the present invention.

Refer to FIG. 6, which is a schematic structural diagram of a semi-reflector. In this embodiment of the present invention. The semi-reflector is substantially in a shape of a long strip. Herein, the "substantially in a shape of a long strip" refers to a shape approximate to a long strip and thin plate, which mainly has several characteristics: the semi-reflector first needs to have a relatively long edge; secondly, has a relatively small thickness; and finally, needs to be approximately in a shape of a cuboid as a whole. A variety of shapes, with a small variation, that are formed based on the foregoing main characteristics also belong to the "substantially in a shape of a long strip", for example, a cuboid whose multiple right angles are manufactured to have a radian, or a cuboid with some planes that are not strictly flat (for example, having a radian or a dent). A person skilled in the art may select, in combination with the context, a semi-reflector, "substantially in a shape of a long strip", that is suitable for this embodiment of the present invention. Preferably, the semi-reflector may be in a shape of a long strip and thin plate that is shown in FIG. 6 and that has a relatively low requirement on the manufacturing technique. When the multiple semi-reflectors form a display screen as a whole, a shape of a periphery may be correspondingly designed according to a requirement on a shape of a product. For example, similar to a shape of a lens of conventional ordinary glasses, the periphery is designed to have a radian to improve aesthetic feeling, or a radian is added to a plane. However, these small changes do not affect the substantial characteristics of the semi-reflector, and in this case, each semi-reflector may be still considered to be "in a shape of a long strip and thin plate".

Each semi-reflector includes two parts: a laminate and inner platings. The laminate is made of a transparent material (such as plastic, resin, or glass), and a split ratio of a plating may be 50:50 (where another split ratio such as 40:60 may also be selected according to a requirement). Because of a transparency feature of the semi-reflector, a user may also see a live view by using the semi-reflector. There may be a particular interval between the semi-reflectors, for example, an interval of tens of nanometers.

An inner plating is a semi-reflective plating embedded in the laminate, and a split ratio of the semi-reflective plating may also be 50:50 or another split ratio. Each inner plating separately corresponds to one or more pixels in a group of pixels, and is configured to reflect the one or more pixels corresponding to the inner plating to a direction of an eyeball center. The inner plating is a plane, and reflects light for only once. Therefore, when parallel light is incident to the inner plating, light rays are not reflected along a same repeated line. In this embodiment of the present invention, the multiple inner platings are arranged in the semi-reflector "substantially in a shape of a long strip" along a length direction, and the inner platings may also be spaced by a particular distance, for example, tens of nanometers.

A quantity of the multiple inner platings may be flexibly selected according to different situations, as long as a "depth of field" effect that needs to be achieved during design can be achieved. For example: if a group of pixels is one column of pixels, the quantity of the multiple inner platings may be set to be the same as a quantity of pixels included in this column of pixels. It should be noted that the "same" herein refers to "substantially the same" rather than completely the same, that is, when an optimal manner is that the quantity of the multiple inner platings is the same as the quantity of pixels included in this column of pixels, an adjustment may be performed on errors, but an amount of this adjustment does not cause a qualitative change in a display effect. For example, the errors are controlled to be within 10% as far as possible, to try to achieve a better effect.

For example, for a frame of image with a resolution of 800*600, during column scanning, because each column includes 600 pixels, 600 inner platings may be disposed, where the multiple inner platings are sequentially arranged, and are configured to reflect a column of pixels that are also sequentially sorted (for example, the first inner plating is configured to reflect the first pixel of this column of pixels, the second inner plating is configured to reflect the second pixel of this column of pixels, and so on). In another embodiment, 599, 595, or another quantity of inner platings rather than 600 inner platings may be disposed. In this case, one or more of the inner platings may be made to have a larger area, so as to reflect multiple pixels. In this case, if a proportion of an amount of this adjustment to a total amount is very small, such adjustment has little effect on experience of the user.

Alternatively, if a group of pixels is two columns of pixels, the quantity of the multiple inner platings may be still set to be substantially the same as a quantity of pixels included in one column of pixels. In this case, one inner plating may simultaneously reflect two pixels once. For example, the first inner plating may simultaneously reflect the first pixel of a first column of pixels and the first pixel of a second column of pixels once, and so on. A meaning of the "substantially the same" herein is consistent with that in the foregoing situation, and details are not described herein.

Alternatively, if a group of pixels is two columns of pixels, the quantity of the multiple inner platings may be set to be substantially the same as a quantity of pixels included in the two columns of pixels. In this case, two layers of inner platings may be disposed, and a quantity of inner platings included in each layer of inner platings is the same as a quantity of pixels included in each column of pixels, and the inner platings of each layer of inner platings are configured to reflect pixels of one column of pixels. A meaning of the "substantially the same" herein is consistent with those in the foregoing two situations, and details are not described herein.

Certainly, this embodiment of the present invention is not limited to the foregoing several manners. For example, in another embodiment, an inner plating in a different part may also be designed to reflect a different quantity of pixels (for example, a part reflects one pixel, a part reflects two pixels, and a part reflects three pixels). A person skilled in the art may specifically design the inner platings according to the foregoing several specific examples in combination with an actual situation, as long as a "depth of field" effect that is needed by a system can be achieved.

Multiple conventional mature technologies may be used as a technology for manufacturing the semi-reflector with the inner platings. Herein, one of manufacturing methods is simply described. For example, a high-precision mold may be manufactured first (for example, by means of laser or etching), high-precision injection manufacturing is performed by using the mold, a lens with a slant surface (that is, an uncoated inner plating) is produced, and then the slant surface is coated, and then injection is performed after the coating is completed, and a surface of the lens is leveled up and then is cut into a needed shape.

In this embodiment of the present invention, each semi-reflector has two states: active and inactive, and each semi-reflector at an inactive position does not affect reflection by another activated semi-reflector on a group of pixels that need to be reflected. A change between the active and inactive states may be implemented in different drive manners.

For example: referring to FIG. 2 to FIG. 5, in an optional implementation manner, the semi-reflector is in a shape of a long strip and thin plate, when each semi-reflector of the multiple semi-reflectors is inactive, the semi-reflector and another semi-reflector are arranged in a manner of aligning long edges to form a first plane (for example, an xy plane in FIG. 2 to FIG. 5), and the first plane is parallel with a plane constituted by light rays that are formed by a group of pixels displayed by the pixel display unit. A pixel displayed by the pixel display unit is not emitted to a semi-reflector and is not reflected. In an active state, the activated semi-reflector flips by a particular angle by using a long edge of the long strip as an axis, and is configured to reflect, to the direction of the eyeball center of the user, the group of pixels displayed by the pixel display unit. By using FIG. 2 to FIG. 5 as examples, because the group of pixels displayed by the pixel display unit is located above the plane formed by the semi-reflector group in the figure, the activated semi-reflector reflects light rays in a manner of flipping up; and conversely, if the group of displayed pixels is located below the plane formed by the semi-reflector group in the figure, the activated semi-reflector reflects light rays in a manner of flipping down.

Figure 7:
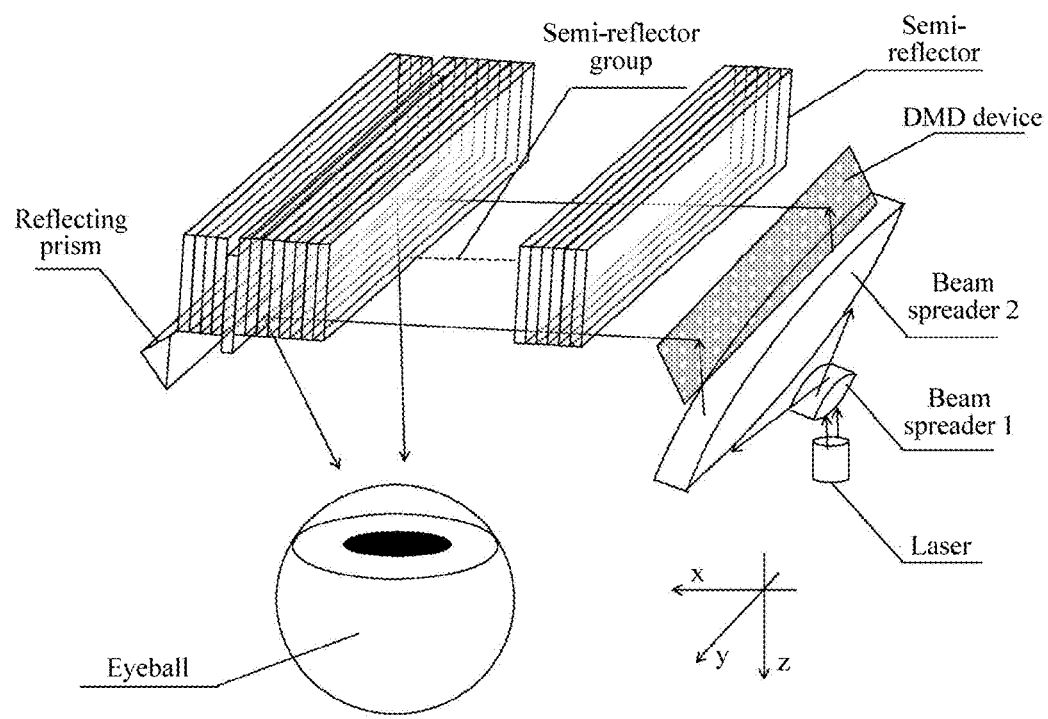
FIG. 7 is a schematic structural diagram of an arrangement manner of multiple semi-reflectors according to Embodiment 3 of the present invention.

Referring to FIG. 7, in another optional implementation manner, the semi-reflector is in a shape of a long strip and thin plate, when each reflector of the multiple reflectors is inactive, the reflector and another reflector are stacked in a thickness direction to form a cube, and a second plane (an xy plane) formed by the cube in the thickness direction is parallel with a plane constituted by light rays that are formed by a group of pixels displayed by the pixel display unit. In this case, the light rays that are formed by the group of pixels displayed by the pixel display unit are not blocked by any semi-reflector and are not reflected to the direction of the eyeball center. In an active state, the activated semi-reflector moves by a distance along a width direction, and is configured to reflect, to the direction of the eyeball center of the user, the group of pixels displayed by the pixel display unit. By using FIG. 7 as an example, because the group of pixels displayed by the pixel display unit is located below a lower surface of the cube in the figure, the activated semi-reflector reflects light rays by moving down by a distance; and conversely, if the group of displayed pixels is located above an upper surface of the cube that is formed by the semi-reflector group in the figure, the activated semi-reflector reflects light rays by moving up by a distance.

Figure 8:
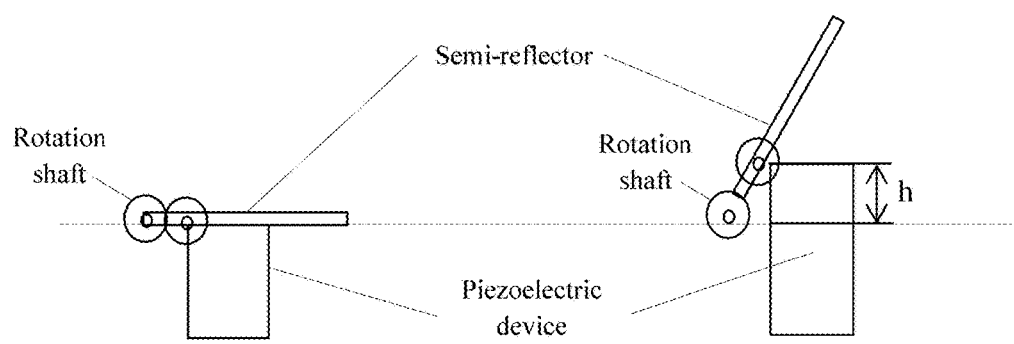
FIG. 8 is a schematic diagram of driving a semi-reflector in a piezoelectric manner according to Embodiment 3 of the present invention.

In this embodiment of the present invention, each semi-reflector is connected to a drive apparatus (for example, a micro-electro-mechanical system Micro Electro-Mechanic System, MEMS), and each drive apparatus is connected to a processor, and drives, by receiving an instruction of the processor, the semi-reflector to enter an active or inactive state. For example, by using the foregoing two implementation manners as examples, the semi-reflector may be driven to rotate by a particular angle, or move by a distance in a vertical direction. Any one or more of piezoelectric device drive, electromagnetic device drive, electrostatic drive, and another manner in commonly-known technologies may be selected as a specific drive manner. For example, referring to FIG. 8, by using the piezoelectric device drive as an example, a left side indicates an inactive state, and a right side indicates an active state. After a particular voltage is applied, a length of a piezoelectric device increases by h, so that the semi-reflector flips by a particular angle along a rotation shaft. If a different angle needs to be implemented, only a different voltage needs to be applied.

If a near-eye display in this embodiment of the present invention is made in a form similar to that of ordinary glasses, the drive apparatus may be disposed in an upper frame or a lower frame of the glasses. Manufacturing of the drive apparatus and a manner of connection between the drive apparatus and the semi-reflector may be both implemented according to a conventional manufacturing manner and a conventional connection manner (for example, bonding), and details are not described herein.

Embodiment 4

Based on the foregoing embodiments, further, a method for implementing panoramic display is described in this embodiment of the present invention. "Panorama" in this embodiment of the present invention refers to that an angle of a light ray that is projected by a near-eye display (specifically referring to multiple semi-reflectors) onto a human eye can cover an entire area, in which a light ray can be received, of an eyeball, and a horizontal angle and a pitch angle are respectively greater than or equal to a maximum horizontal angle and a maximum pitch angle that are of a field of view of the human eye (for example, a visual angle of the human eye is an ellipsoidal surface, the maximum horizontal angle is 155 degrees, and the maximum pitch angle is 135 degrees). Certainly, the foregoing limitation is a relatively ideal limitation. In practice, adaptive adjustments may also be performed according to a specific indicator requirement on the "panorama". For example, the horizontal angle or the pitch angle may be appropriately reduced to some extent. Although an effect is slightly reduced, such reduction may not be perceived from the perspective of user experience, which therefore, may also be considered as the "panorama". These adaptive adjustments are technologies commonly-known by a person skilled in the art, and shall all be included in the protection scope of the present invention.

Based on different positions at which a pixel display unit is disposed, correspondingly, the multiple semi-reflectors may be controlled to be active or inactive by using different methods, so as to reflect displayed pixels onto an eye of a user. Exemplary descriptions are separately made below for several situations.

(1) The Pixel Display Unit is Disposed on One Side.

In this case, the pixel display unit in this embodiment of the present invention may include two parts, which are separately configured to display two sides (such as left and right sides, or upper and lower sides) of an image, and which are separately named a first side pixel display unit and a second side pixel display unit. The first side pixel display unit is configured to display pixels that are on one side (for example, a left side) of a frame of image, and the second side pixel display unit is configured to display pixels that are on the other side (for example, a right side) of the frame of image. Preferably, ranges of the frame of image displayed on the two sides are the same (for example, a 400*600 area of an image with a resolution of 800*600 is displayed on each of the two sides). It should be noted that in this embodiment and in other embodiments, these two parts may share some devices rather than be required to be implemented as two parts of completely independent devices during physical implementation. For example, by using an example in FIG. 9 in which the pixel display unit is implemented by using a DMD device, a lens group, and a laser, in this case, the lens group and the laser may be shared, and the DMD device is designed into a device that can separately display two parts of pixels.

Correspondingly, the multiple semi-reflectors are also divided into two parts, which are separately named a first side semi-reflector group and a second side semi-reflector group, where a semi-reflector group on each side includes multiple semi-reflectors. A quantity of semi-reflectors in the first side semi-reflector group is the same as a quantity of groups of multiple groups of pixels that the first side pixel display unit is configured to display, and the semi-reflectors separately correspond to the multiple groups of pixels. A quantity of semi-reflectors in the second side semi-reflector group is the same as a quantity of groups of multiple groups of pixels that the second side pixel display unit is configured to display, and the semi-reflectors separately correspond to the multiple groups of pixels. Preferably, semi-reflector groups on two sides are substantially symmetrically distributed on the two sides by using an eyeball center as a center. Herein, "substantially symmetrically" refers to "not strictly symmetrically" in practice, and instead, there may be an error and a redundancy. For example, two groups of semi-reflectors that have a same quantity and that are centrosymmetric may be made. However, because there is a difference in shapes of heads of persons, positions of human eyes, and sizes of human eyes, when the two groups of lenses are placed in practice, for each wearer, the two groups of lenses cannot be strictly symmetrical to an eyeball center of each wearer, and it is allowable for the entirety to deviate by a small angle (for example, an angle within 10%) after being worn; or there may be a small difference between quantities of the two groups of semi-reflectors, for example, one group has several more semi-reflectors than the other group.

Moreover, a reflecting prism is further added in this embodiment of the present invention, and a function of the reflecting prism in this embodiment is to enable light, which is incident in parallel, to be reflected within the reflecting prism and then reflected out in parallel in a reverse direction. The reflecting prism is disposed at a position that is on a side opposite to the pixel display unit.

Figure 9:
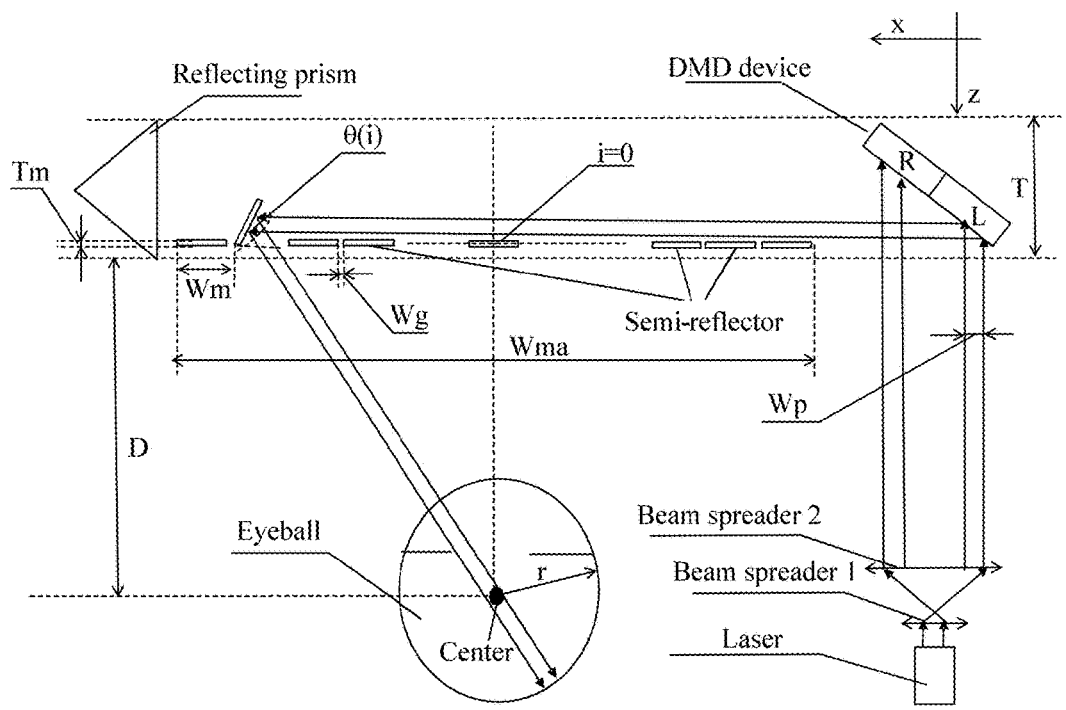
FIG. 9 is a diagram of a working principle of a near-eye display according to Embodiment 4 of the present invention.
Figure 10:
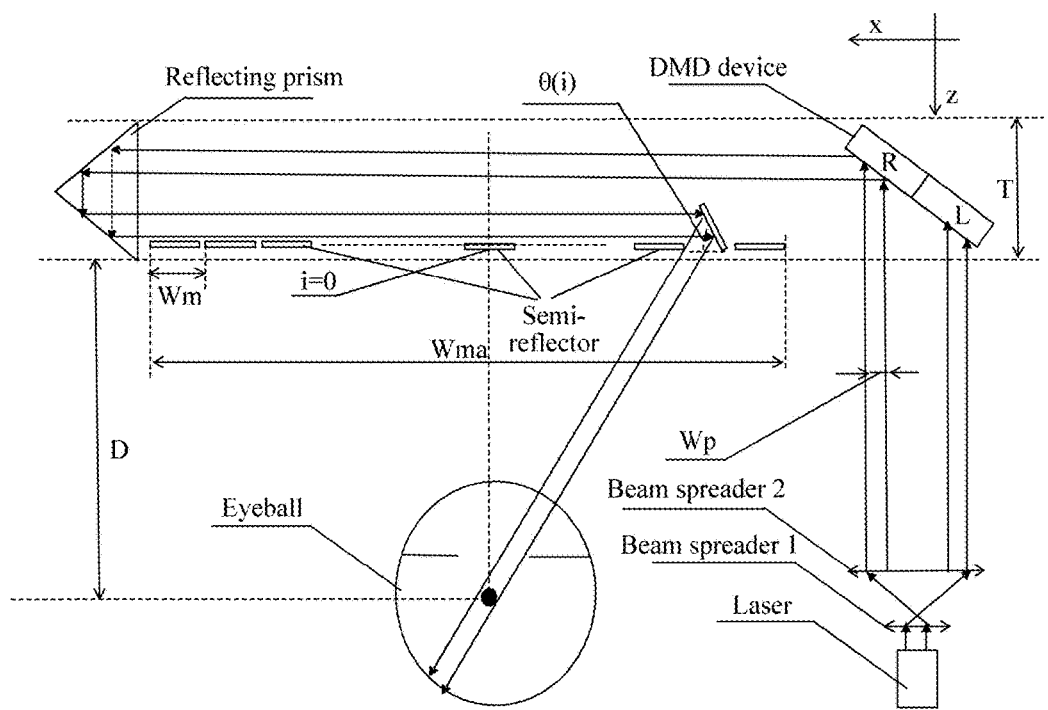
FIG. 10 is a diagram of a working principle of a near-eye display according to Embodiment 4 of the present invention.

FIG. 9 is a view of the near-eye display on an xz plane. As shown in FIG. 9, when a frame of image needs to be displayed, and when the first side pixel display unit displays a group of pixels, the displayed pixels are directly reflected onto an eye by activating a semi-reflector that corresponds to this group of pixels and that is in multiple first side semi-reflector groups. FIG. 10 is still a view of the near-eye display on an xz plane. As shown in FIG. 10, when displaying a group of pixels, the second side pixel display unit reflects the group of displayed pixels by means of the reflecting prism rather than directly reflects the group of displayed pixels onto an eye by using the second side semi-reflector group, that is, the group of pixels displayed by the second side pixel display unit is first reflected onto a semi-reflector in the second side semi-reflector group by using the reflecting prism, and then is reflected onto the eye by using the semi-reflector.

By means of cooperation of the reflecting prism, the group of pixels displayed by the second side pixel display unit may be refracted back, and then is emitted to the semi-reflector in the second side semi-reflector group. The second side semi-reflector group is located on the other side of the eyeball relative to the first side semi-reflector group, so that the eyeball may receive light that is reflected at an angle from the other side, which expands a light receiving angle of a surface of the eyeball, and implements panoramic display desirably.

(2) Pixel Display Units are Disposed on Two Sides.

Figure 11:
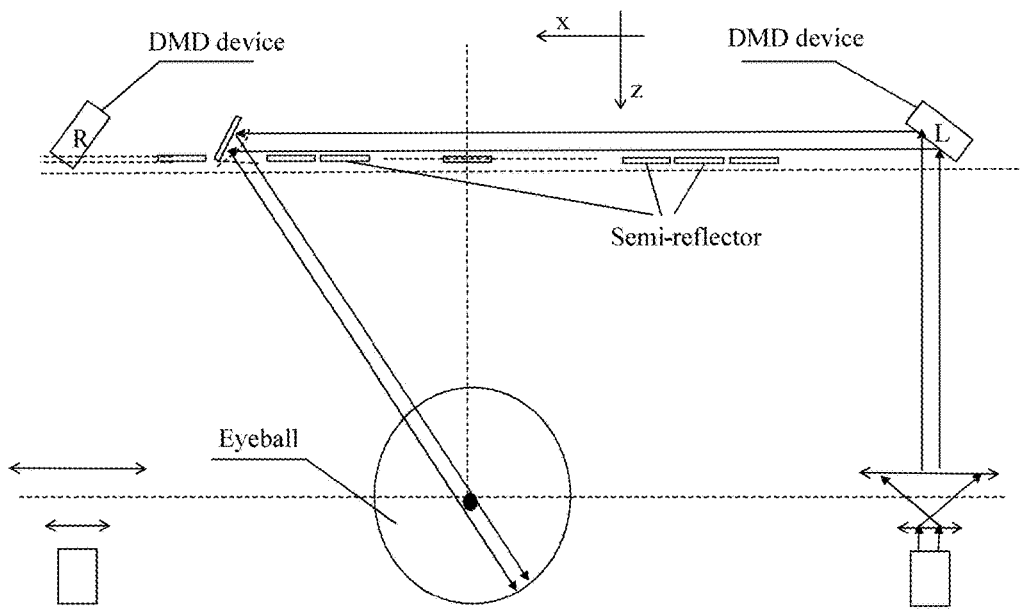
FIG. 11 is a diagram of a working principle of another near-eye display according to Embodiment 4 of the present invention.
Figure 12:
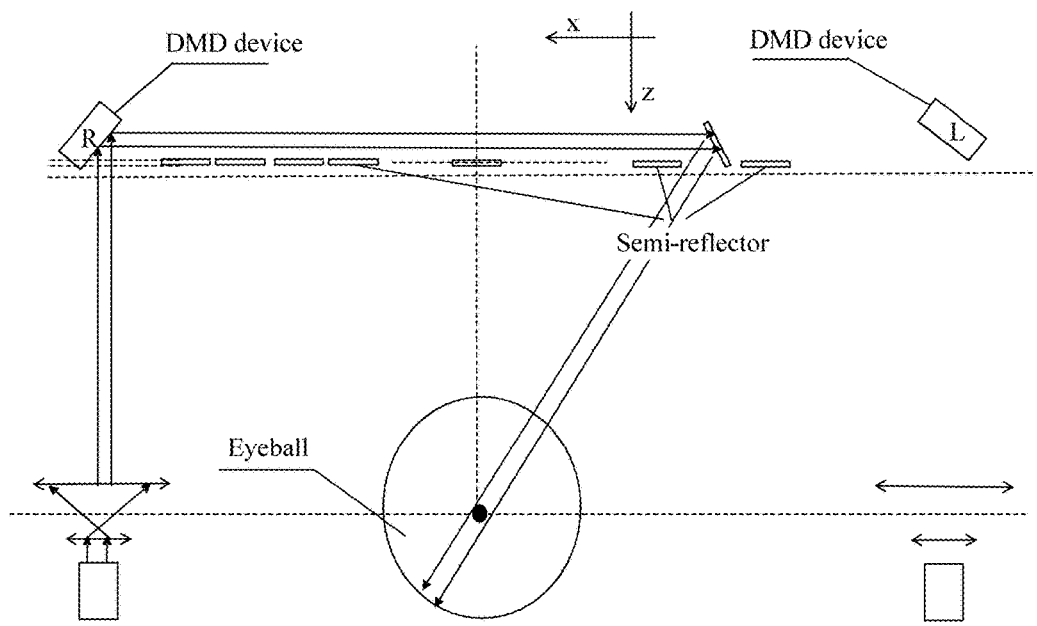
FIG. 12 is a diagram of a working principle of another near-eye display according to Embodiment 4 of the present invention.

Referring to FIG. 11 and FIG. 12, for one eyeball, the pixel display units may also be separately located on the two sides of the eyeball. For example, by using glasses as an example, one pixel display unit is located at a temple, and the other pixel display unit is located at a nose bridge.

In this case, compared with the first situation, the pixel display unit on one side is equivalent to the first side pixel display unit in the first situation, and the pixel display unit on the other side is equivalent to the second side pixel display unit in the first situation. Correspondingly, semi-reflector groups symmetrical to the eyeball may be separately disposed on two sides.

In this case, a reflecting prism may be omitted, multiple groups of pixels are separately displayed by using the pixel display units on the two sides, and light is reflected onto the eyeball at multiple angles by means of reflection by a semi-reflector group on a corresponding side. For example, in FIG. 11, multiple groups of pixels displayed by a left side pixel display unit are reflected by using a semi-reflector group on a right side, and in FIG. 12, multiple groups of pixels displayed by a right side pixel display unit are reflected by using a semi-reflector group on a left side, thereby implementing panoramic display.

The foregoing examples are several common implementation manners. In another embodiment, the pixel display unit and the multiple semi-reflectors may also be disposed at other positions. A person skilled in the art may adaptively adjust some manners in the another embodiment with reference to the foregoing embodiment, so that a panoramic display effect can be achieved in the another embodiment.

Embodiment 5

Based on the foregoing embodiments, a working principle of a near-eye display is specifically described in this embodiment of the present invention based on a specific implementation manner. The near-eye display in this embodiment is designed into a shape of common glasses. A user may observe a live view by using lenses of the glasses, and may further view, in a display manner provided in this embodiment, an image sent by the glasses.

A pixel display unit in the near-eye display in this embodiment of the present invention is disposed on one side (a right side in the figure and at a position of a temple in practice) of the near-eye display, includes a DMD device, a laser, a beam spreader 1, and a beam spreader 2, and is configured to display an image that is output by means of column scanning, where a part marked with "L" in the figure means displaying a left part of the image, and a part marked with "R" in the figure means displaying a right part of the image. For ease of description, a processor and other devices are not shown in the figure herein.

When multiple semi-reflectors in this embodiment of the present invention are in an inactive state, the multiple semi-reflectors are arranged to form a plane, and deflect by an angle when activated to reflect pixels. As shown in FIG. 9 and FIG. 10, the multiple semi-reflectors are divided into two parts by using an axis passing through an eye as a center, where a left part is used to reflect the left part of the image displayed by the pixel display unit, and a right part is used to reflect the right part of the image displayed by the pixel display unit. To cooperate with reflection by the right part, a reflecting prism is further added herein, that is, an R-side reflecting prism shown in the figure Meanings of parameters shown in the figure are as follows: Wm: a width of a semi-reflector, including a physical width of the semi-reflector and a gap between two semi-reflectors; $\theta(i)$: an angle between an $i^{th}$ (where i is an integer greater than or equal to 0) semi-reflector unit and a horizontal plane when the $i^{th}$ semi-reflector unit is activated, where a number of a semi-reflector unit right facing an eyeball center is 0, and numbers of semi-reflector units on left and right sides sequentially increase; Wma: a width of a lens array, where a value of the width is equal to a quantity of semi-reflector units multiplied by Wm; Wp: a width of a group of pixels, which is a total width of a group of pixels that is displayed on the DMD device each time a semi-reflector unit is activated; D: a distance from a plane of a semi-reflector group to the eyeball center; T: a thickness of the entire near-eye display before an eye; Tm: a thickness of the semi-reflector; and Wg: the gap between the semi-reflectors.

The parameters satisfy the following relations:

$$\theta(i) = 90 - \frac{1}{2} \times atg\left(\frac{D}{i \times Wm}\right) (deg); \quad \text{(formula 11)}$$
$$i \neq 0, i \in \text{a positive interger}$$

$$\theta(i) = 45 \ (deg); i = 0 \quad \text{(formula 12)}$$

$$T \geq \sqrt{2} \times Wm \quad \text{(formula 13)}$$

$$Wp \geq \frac{Wm}{\sqrt{2}} \quad \text{(formula 14)}$$

$$Wg \geq Tm \quad \text{(formula 15)}$$

where the formulas 11 and 12 are used to limit that each semi-reflector reflects a group of displayed pixels to a direction of an eyeball center when the semi-reflector is activated; the formula 13 is used to limit that the thickness of the lens of the entire glasses needs to satisfy a placement requirement of the reflecting prism; the formula 14 is used to limit a relationship between a width of a lens of the semi-reflector and a column width of the pixels, and the pixels are displayed incompletely if the relationship is not satisfied; and the formula 15 is used to limit the gap between lenses of the semi-reflectors and the thickness of the lens of the semi-reflector, and the semi-reflector cannot implement flip if this requirement is not satisfied.

Figure 13:
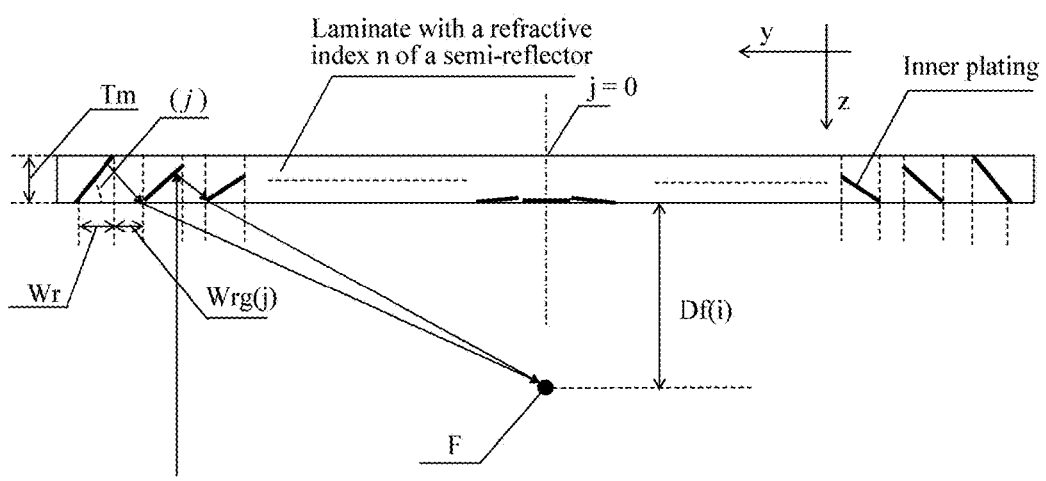
FIG. 13 is a schematic structural diagram of a semi-reflector according to Embodiment 5 of the present invention.

Refer to FIG. 13, which is a view of a semi-reflector in a yz section in this embodiment of the present invention. As shown in FIG. 13, a reflective plating is built in the semi-reflector unit, and a laminate of the semi-reflector is made of a material with a refractive index n, and has a thickness of Tm. The inner plating is divided into inclined plane units with a width Wr and an interval Wrg(j) in a horizontal direction, and includes 2N+1 units in total, and an index i of an inner plating unit is 0 at an intermediate axis, and separately increases to the left and right. An angle $\varphi(i)$ between a plane of an $i^{th}$ inner plating and a horizontal plane shown in the figure, and the interval Wrg(i) between the $i^{th}$ inner plating and a previous unit are derived from formulas 21, 22, and 23. All horizontal incident light is focused on a focal point on the intermediate axis shown in the figure, where a distance from the focal point to a surface of the lens is Df.

$$\varphi(j) = \frac{1}{2}\arccos\left(\frac{1}{n}\cos\left(arctg\left(\frac{Df}{\sum_{i=0}^{N} Wrg(j) + N*Wr}\right)\right)\right), \quad \text{(formula 21)}$$
$$j \neq 0, j \text{ is a positive interger}$$

$$\varphi(j) = 0, j = 0 \quad \text{(formula 22)}$$

$$Wrg(j) = Wr*tg(\varphi(j-1))*tg(2\varphi(j-1)) \quad \text{(formula 23)}$$

An inclined inner plating focuses only reflected light without causing a distortion effect on transmitted light, where the reflected light is focused on the focal point F. In the semi-reflector group, a focal length Df(i) of an $i^{th}$ semi-reflector unit satisfies a formula 24.

$$Df(i) = \frac{D}{\sin(\theta(i))} \quad \text{(formula 24)}$$

Figure 14:
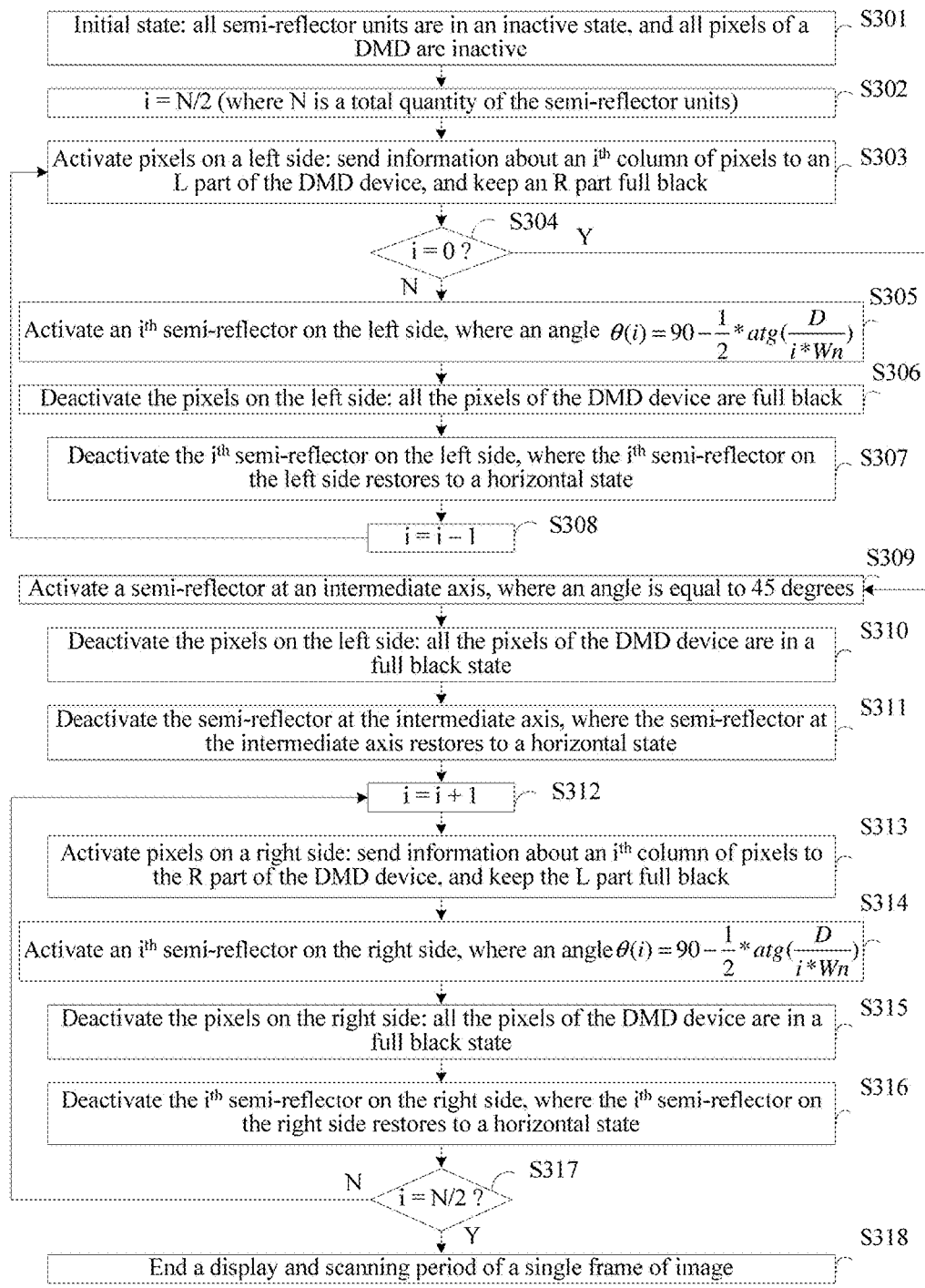
FIG. 14 is a schematic diagram of a working procedure of a near-eye display according to Embodiment 5 of the present invention.

Referring to FIG. 14, based on the foregoing conditions, a process of scanning a frame of image in this embodiment of the present invention includes the following steps.

S301: Enter an initial state, where all semi-reflector units are in an inactive state, and all pixels of a DMD are inactive, and perform step S302.

S302: Set a variable i=N/2 (where N is a total quantity of the semi-reflector units), and perform step S303.

S303: Activate pixels on a left side: send information about an $i^{th}$ column of pixels to an L part of the DMD device, and keep an R part full black; and perform step S304.

S304: Determine whether i is equal to 0, and if yes, perform step S309, or if not, perform step S305.

S305: Activate an $i^{th}$ semi-reflector on the left side, where an angle is shown in the formula 11, and perform step S306.

S306: Deactivate the pixels on the left side: all the pixels of the DMD device are full black, and perform step S307.

S307: Deactivate the $i^{th}$ semi-reflector on the left side, where the $i^{th}$ semi-reflector on the left side restores to a horizontal state, and perform step S308.

S308: Set i to be equal to i−1, and perform step S303.

S309: Activate a semi-reflector at an intermediate axis, where an angle is equal to 45 degrees, and perform step S310.

S310: Deactivate the pixels on the left side: all the pixels of the DMD device are in a full black state, and perform step S311.

S311: Deactivate the semi-reflector at the intermediate axis, where the semi-reflector at the intermediate axis restores to a horizontal state, and perform step S312.

S312: i=i+1, and perform step S313.

S313: Activate pixels on a right side: send information about an $i^{th}$ column of pixels to the R part of the DMD device, and keep the L part full black; and perform step S314.

S314: Activate an $i^{th}$ semi-reflector on the right side, where an angle is shown in the formula 11, and perform step S315.

S315: Deactivate the pixels on the right side: all the pixels of the DMD device are in a full black state, and perform step S316.

S316: Deactivate the $i^{th}$ semi-reflector on the right side, where the $i^{th}$ semi-reflector on the right side restores to a horizontal state, and perform step S317.

S317: Determine whether i is equal to N/2, and if yes, perform step S318, or if not, perform step S312.

S318: End a display and scanning period of a single frame of image.

By means of this embodiment of the present invention, because an image is displayed on the basis of a lens, a live view may overlap with a displayed image, and because each semi-reflector can reflect a group of pixels by using built-in platings, a desirable depth of field effect can be achieved. Moreover, in this embodiment of the present invention, a reflecting prism is added for cooperation to reflect a light ray to a direction of an eyeball center within a large range of field of view, so that a panoramic effect is achieved desirably.

Embodiment 6

Figure 15:
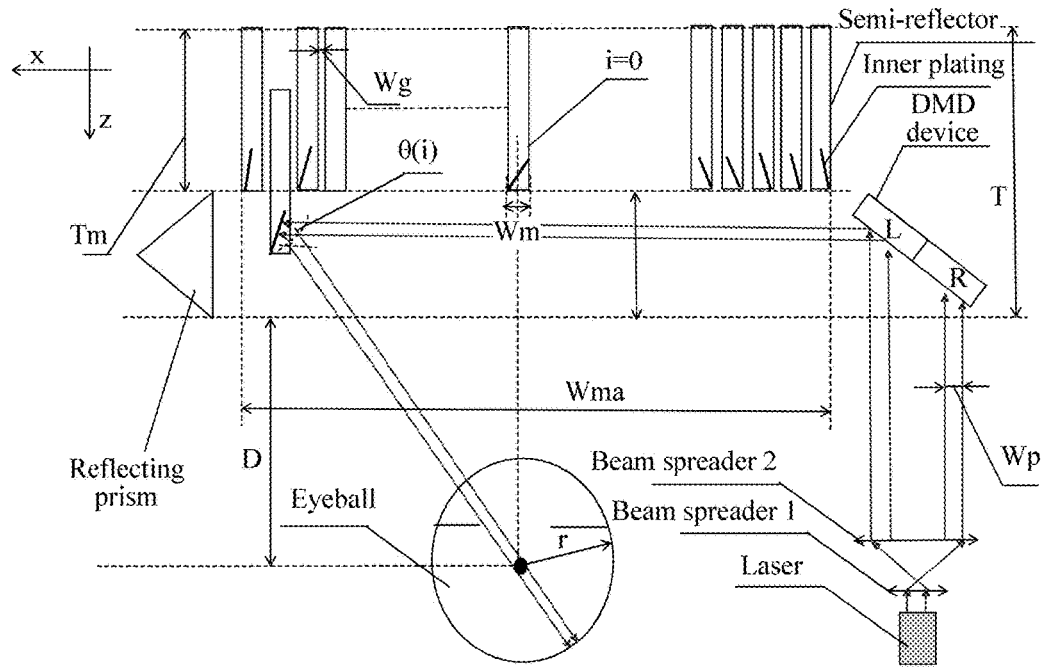
FIG. 15 is a diagram of a working principle of a near-eye display according to Embodiment 6 of the present invention.
Figure 16:
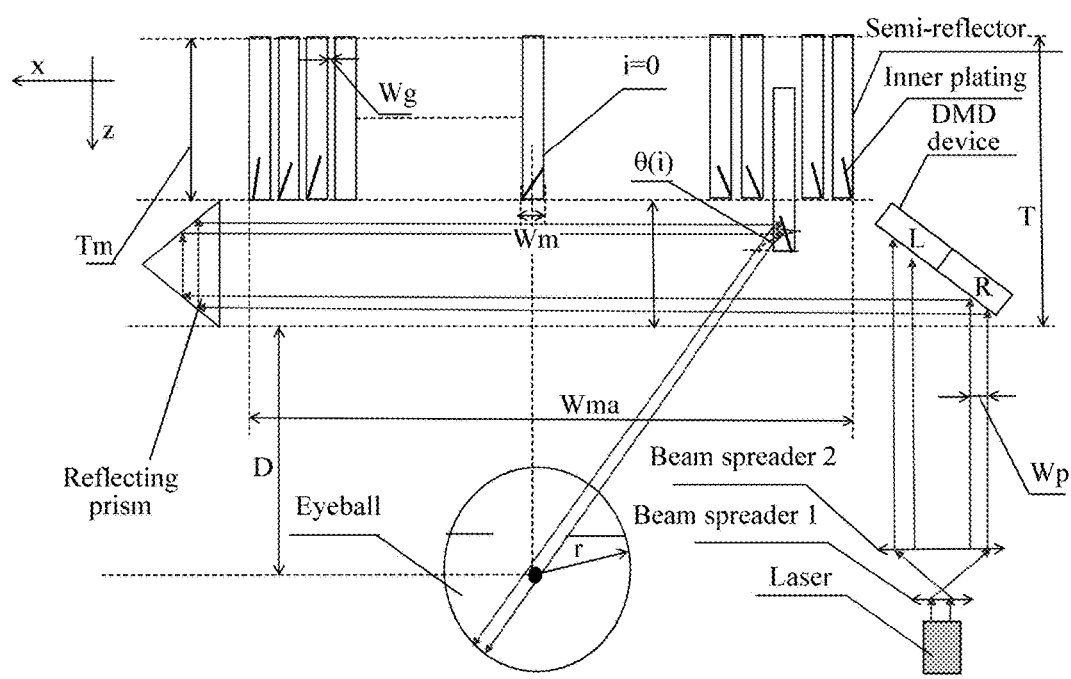
FIG. 16 is a diagram of a working principle of a near-eye display according to Embodiment 6 of the present invention.

Referring to FIG. 7, FIG. 15, and FIG. 16, based on the foregoing embodiments, a working principle of a near-eye display is specifically described in this embodiment of the present invention based on a specific implementation manner. The near-eye display in this embodiment is basically the same as that in Embodiment 5, but multiple semi-reflectors perform reflection in a perpendicular alignment arrangement manner that is described in Embodiment 3 and that is shown in FIG. 7.

FIG. 15 is a schematic principle diagram of an xz plane when left-side light is reflected. FIG. 16 is a schematic principle diagram of an xz plane when right-side light is reflected. Parameters in the two figures and relationships between the parameters are as follows: Wm: a thickness of a semi-reflector, which is different from that in the previous embodiment, where a gap is not included herein; θ(i): an angle between an inner plating unit of an $i^{th}$ (where i is an integer greater than or equal to 0) semi-reflector unit and a horizontal plane, where a number of a semi-reflector unit right facing an eyeball center is 0, and numbers of semi-reflector units on left and right sides sequentially increase; Wma: a width of a lens array, where a value of the width is equal to a quantity of semi-reflector units multiplied by (Wm+Wg); Wp: a width of a group of pixels, which is a total width of a group of pixels that is displayed on a DMD device each time a semi-reflector unit is activated; D: a distance from a plane of a semi-reflector group to the eyeball center; T: a thickness of the entire near-eye display before an eye; Tm: a thickness of the semi-reflector; Wg: a gap between the semi-reflectors; and n: a refractive index of a material of a lens.

The parameters satisfy the following formulas:

$$\theta(i) = 90 - \frac{1}{2} \times \arcsin\left(\frac{\cos\left(\arctg\left(\frac{(Wm+Wg)\times i}{D}\right)\right)}{n}\right)(deg); \quad \text{(formula 31)}$$

$$i \neq 0, i \in \text{a positive integer}$$

$$\theta(i) = 45(deg); i = 0 \quad \text{(formula 32)}$$

$$Wp \geq \frac{Wm}{\sqrt{2}} \quad \text{(formula 33)}$$

$$Wg \geq Tm \quad \text{(formula 34)}$$

Inner platings in each semi-reflector unit are disposed in a same manner as that in Embodiment 5. A person skilled in the art may dispose the inner platings with reference to FIG. 13, formulas 21 to 24, and related descriptions, and details are not described herein.

Figure 17:
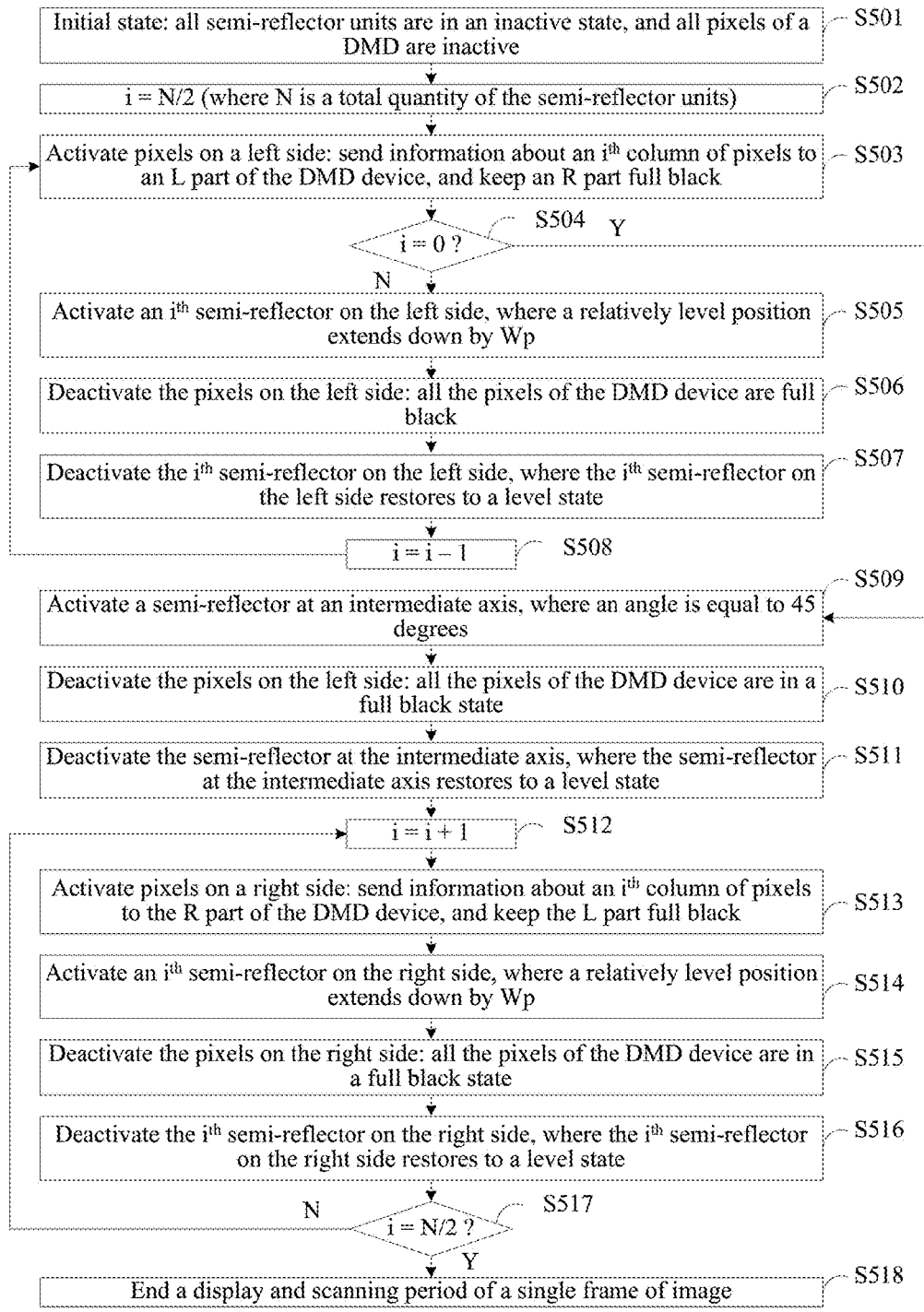
FIG. 17 is a schematic diagram of a working procedure of a near-eye display according to Embodiment 6 of the present invention.

Referring to FIG. 17, based on the foregoing conditions, a process of scanning a frame of image in this embodiment of the present invention includes the following steps.

S501: Enter an initial state, where all semi-reflector units are in an inactive state, and all pixels of a DMD are inactive, and perform step S502.

S502: Set a variable i=N/2 (where N is a total quantity of the semi-reflector units), and perform step S503.

S503: Activate pixels on a left side: send information about an $i^{th}$ column of pixels to an L part of the DMD device, and keep an R part full black; and perform step S504.

S504: Determine whether i is equal to 0, and if yes, perform step S509, or if not, perform step S505.

S505: Activate an $i^{th}$ semi-reflector on the left side, where an angle is shown in the formula 11, and perform step S506.

S506: Deactivate the pixels on the left side: all the pixels of the DMD device are full black, and perform step S507.

S507: Deactivate the $i^{th}$ semi-reflector on the left side, where the $i^{th}$ semi-reflector on the left side restores to a horizontal state, and perform step S508.

S508: Set i to be equal to i−1, and perform step 503.

S509: Activate a semi-reflector at an intermediate axis, where an angle is equal to 45 degrees, and perform step S510.

S510: Deactivate the pixels on the left side: all the pixels of the DMD device are in a full black state, and perform step S511.

S511: Deactivate the semi-reflector at the intermediate axis, where the semi-reflector at the intermediate axis restores to a horizontal state, and perform step S512.

S512: i=i+1, and perform step S513.

S513: Activate pixels on a right side: send information about an $i^{th}$ column of pixels to the R part of the DMD device, and keep the L part full black; and perform step S514.

S514: Activate an $i^{th}$ semi-reflector on the right side, where an angle is shown in the formula 11, and perform step S515.

S515: Deactivate the pixels on the right side: all the pixels of the DMD device are in a full black state, and perform step S516.

S516: Deactivate the $i^{th}$ semi-reflector on the right side, where the $i^{th}$ semi-reflector on the right side restores to a horizontal state, and perform step S517.

S517: Determine whether i is equal to N/2, and if yes, perform step S518, or if not, perform step S512.

S518: End a display and scanning period of a single frame of image.

The same as Embodiment 5, a live view can also overlap with an image in this embodiment of the present invention, and the image is displayed in a panoramic and three-dimensional manner, so that user experience is better improved.

Embodiment 7

Figure 18:
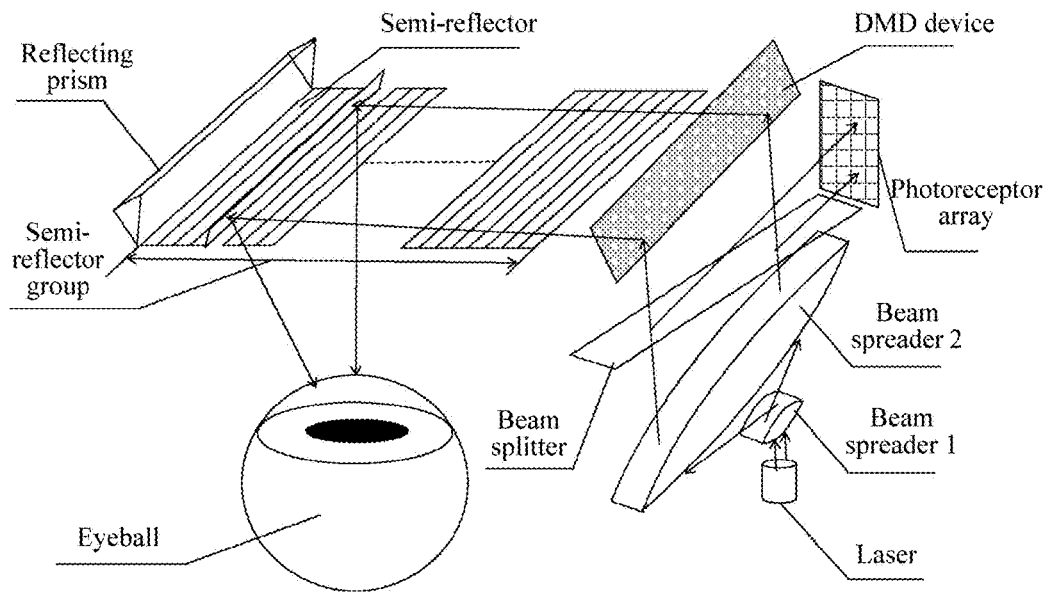
FIG. 18 is a schematic structural diagram of a near-eye display having an eyeball detection function according to Embodiment 7 of the present invention.

Referring to FIG. 18, based on the foregoing embodiments, this embodiment of the present invention provides a near-eye display with an eyeball detection function.

A beam splitter and a photoreceptor array are further disposed. The beam splitter is configured to reflect, onto the photoreceptor array, light reflected by an eyeball. The photoreceptor array generates corresponding data according to the light reflected by the beam splitter and stores the data. In this case, the data stored in the photoreceptor array can manifest an image from the eyeball. A processor connected to the photoreceptor array may detect the eyeball according to the data stored in the photoreceptor array, identify a position and a state of the eyeball, and execute different operation actions according to information such as the position and the state of the eyeball, for example, turn off the near-eye display if the processor identifies that a human eye is closed for a long period of time, or pause video playing when the processor identifies that a human eye blinks quickly.

Embodiment 8

Figure 19:
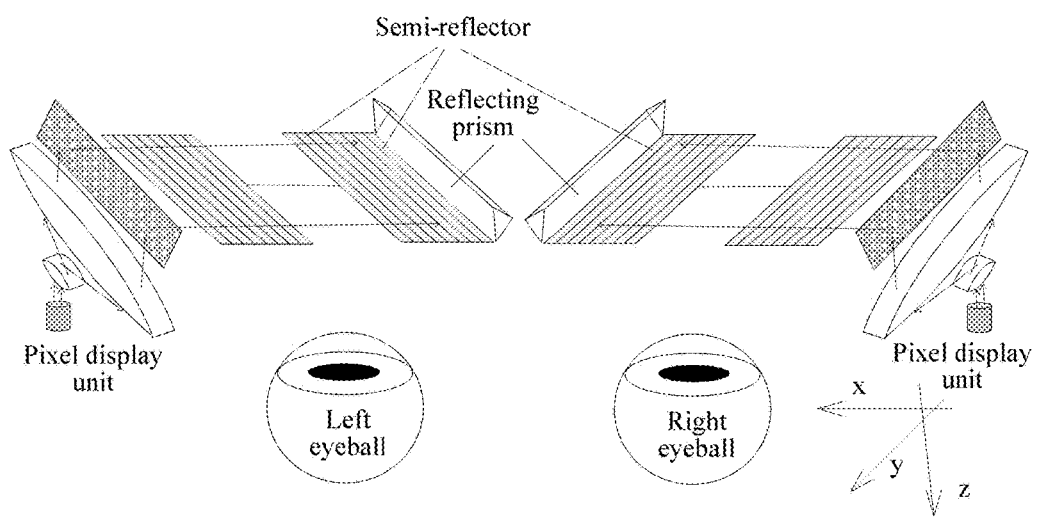
FIG. 19 is a schematic structural diagram of a near-eye display according to Embodiment 8 of the present invention.

Referring to FIG. 19, based on the foregoing embodiments, this embodiment of the present invention provides a near-eye display. In this embodiment, near-eye display systems (for example, both the systems include a pixel display unit, multiple semi-reflectors, and a reflecting prism) are separately disposed for left and right eyes. As shown in FIG. 19, the two systems are symmetrically disposed. If a desirable panoramic display effect needs to be obtained, as described in the foregoing embodiment, both the left and right systems may first display a part (such as a left side) of a frame of image, and then display the other part (such as a right side). In this case, the near-eye display system on the right side in FIG. 19 may work according to a working principle that is exemplified in Embodiment 5, and the near-eye display system on the left side may be adaptively adjusted, that is, pixels, of an image, that are on the left side are first reflected onto an eye by using a reflecting prism and multiple semi-reflectors on the left side, and then pixels, of the image, that are on the right side are reflected onto an eye by using multiple semi-reflectors on the right side (not through a reflecting prism).

In this embodiment of the present invention, because both eyes can perform observation, visual experience is further enhanced on the basis of an effect that can be achieved in the foregoing embodiments.

Embodiment 9

Figure 20:
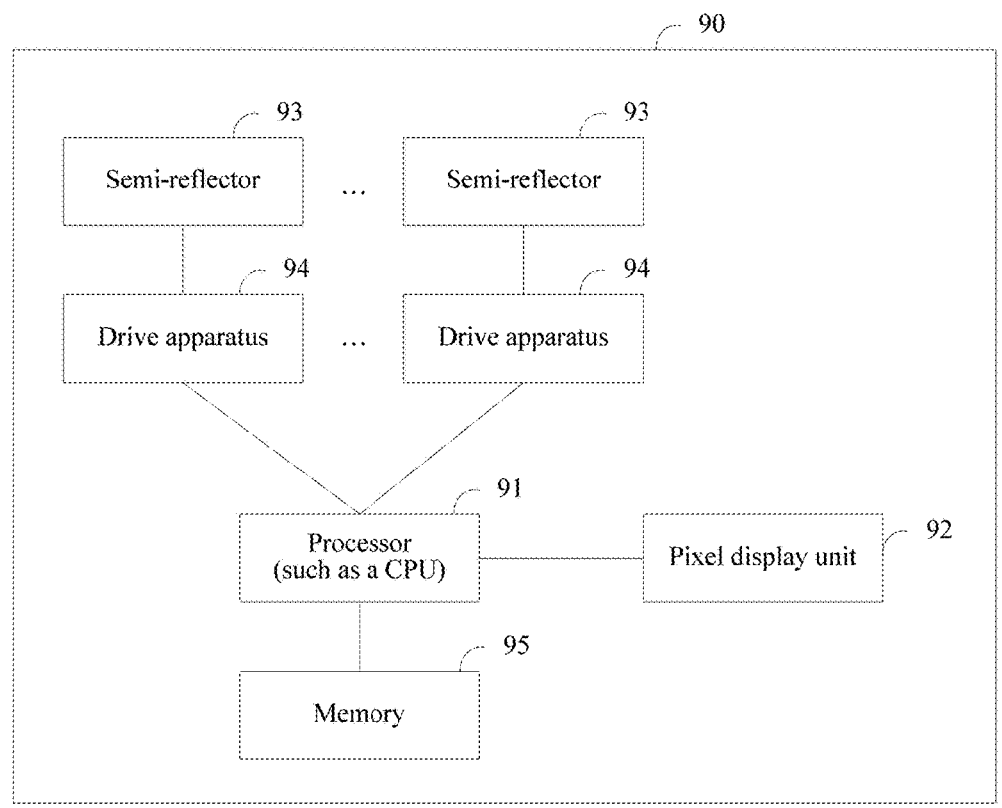
FIG. 20 is a schematic structural diagram of a near-eye display according to Embodiment 9 of the present invention.

Referring to FIG. 20, based on the foregoing embodiments, this embodiment of the present invention provides a near-eye display, including: multiple semi-reflectors 93, where each reflector may be driven by a drive apparatus 94; a pixel display unit 92; a processor 91; and a memory 95, where the memory is configured to store code that is needed for the processor to execute a program and running data.

The processor is connected to the pixel display unit and each drive apparatus, and is configured to control, by executing the program, the pixel display unit to display pixels in the manners that are described in the foregoing embodiments on one hand, and control, when a semi-reflector needs to be activated, the drive apparatus (such as an MEMS) to drive the semi-reflector to be in an active state on the other hand, so that the semi-reflector can reflect the pixels onto an eye.

For specific descriptions of the semi-reflector, the drive apparatus, and the pixel display unit, reference may be made to the foregoing embodiments, and details are not described herein.

For a specific shape, the near-eye display may be made in a form of glasses, where the pixel display unit, the processor, and the memory are placed in a temple, a lens includes the multiple semi-reflectors, and the drive apparatus may be placed in an upper part or a lower part of a frame.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM), a random access memory (RAM), or the like.

In the foregoing exemplary embodiments, the objectives, technical solutions, and benefits of the present invention are further described in detail. It should be understood that the foregoing descriptions are merely exemplary embodiments of the present invention, but are not intended to limit the present invention. Any modification, equivalent replacement, or improvement made without departing from the spirit and principle of the present invention shall fall within the protection scope of the present invention

What is claimed is:

1. A near-eye display device comprising:
   a pixel display configured to display multiple groups of pixels, in each frame of image, that are output by scanning, wherein each group of pixels comprises multiple pixel subunits, and each pixel subunit comprises at least one pixel; and multiple semi-reflectors, wherein each of the semi-reflectors is in a one-to-one correspondence with each group of pixels displayed by the pixel display, each of the semi-reflectors comprises multiple inner platings that are disposed at different reflection angles, each inner plating is in a one-to-one correspondence with each pixel subunits that is in a group of pixels corresponding to a semi-reflector in which the inner plating is located, and wherein each of the semi-reflectors is configured to be activated when the group of pixels corresponding to the semi-reflector is activated, and is configured to reflect light emitted from each pixel subunit which is in an one-to-one correspondence with each inner plating to a direction of an eyeball center by using all the inner platings comprised in the semi-reflector;

the semi-reflector is substantially in a shape of a long strip, and the multiple inner platings are arranged along a length direction of the long strip;

in an active state, the activated semi-reflector is configured to flip by an angle by using a long edge of the long strip as an axis.

2. The near-eye display according to claim 1, wherein an angle of a light ray that is projected by the multiple semi-reflectors onto a human eye covers an entire area in which a light ray can be received of an eyeball, and a horizontal angle and a pitch angle that are formed by the light ray projected onto the human eye are respectively greater than or equal to a maximum horizontal angle and a maximum pitch angle that are of a field of view of the human eye.

3. The near-eye display according to claim 1, wherein the pixel display comprises:

a first side pixel display and a second side pixel display, wherein the first side pixel display is configured to display a first subset of the multiple groups of pixels that are located on a first side of the image, the second side pixel display is configured to display a second subset of the multiple groups of pixels that are located on a second side of the image, and in each frame of image, the first subset of the multiple groups of pixels located on the first side of the image and the second subset of the multiple groups of pixels located on the second side of the image constitute a frame of image;

the multiple semi-reflectors comprise multiple first side semi-reflectors and multiple second side semi-reflectors, wherein the multiple first side semi-reflectors separately correspond to the first subset of the multiple groups of pixels displayed by the first side pixel display, and the multiple second side semi-reflectors separately correspond to the second subset of the multiple groups of pixels displayed by the second side pixel display;

the near-eye display further comprises: a reflecting prism, configured to reflect light emitted from a group of pixels displayed by the second side pixel display;

each semi-reflector of the multiple first side semi-reflectors is configured to be activated when a group of pixels displayed by the first side pixel display is activated, and is configured to reflect light emitted from the group of displayed pixels onto the eye by using the inner platings after each semi-reflector of the multiple first side semi-reflectors is activated; and each semi-reflector of the multiple second side semi-reflectors is configured to be activated when a group of pixels displayed by the second side pixel display is activated, and is configured to reflect light emitted from group of pixels displayed by the second side pixel display, to the direction of the eyeball center by using the inner platings after light emitted from the group of pixels is reflected through the reflecting prism.

4. The near-eye display according to claim 3, wherein the first side pixel display is a left side pixel display, and the second side pixel display is a right side pixel display;

when the first side pixel display is configured to display the first subset of the multiple groups of pixels that are output by column scanning and that are located on a left side of the image; and when the second side pixel display is configured to display the second subset of the multiple groups of pixels that are output by column scanning and that are located on a right side of the image.

5. The near-eye display according to claim 1, wherein the pixel display outputs the multiple groups of pixels in each frame of image by column scanning, and each group of pixels is one or more columns of pixels;

when each group of pixels is a column of pixels, a quantity of the inner platings in each semi-reflector is equal to a quantity of pixels in the column of pixels, and each inner plating separately corresponds to each pixel in the column of pixels; or when each group of pixels is multiple columns of pixels, a quantity of the inner platings in each semi-reflector is equal to a quantity of pixels in one column of pixels, and each inner plating separately corresponds to multiple pixels in each row in the multiple columns of pixels; or when each group of pixels is multiple columns of pixels, a quantity of the inner platings in each semi-reflector is equal to a quantity of pixels in the multiple columns of pixels, and each inner plating is in a one-to-one correspondence with each pixel of the multiple columns of pixels.

6. The near-eye display according to claim 1, wherein each semi-reflector, of the multiple semi-reflectors, that is at an inactive position does not block light emitted to an activated semi-reflector.

7. The near-eye display according to claim 1, wherein the semi-reflector is in a shape of a long strip and thin plate, when each semi-reflector of the multiple semi-reflectors is inactive, the reflector and another reflector are arranged in a manner of aligning long edges to form a first plane, and the first plane is parallel with a plane constituted by light rays that are formed by a group of pixels displayed by the pixel display.

8. The near-eye display according to claim 7, wherein when glasses are normally worn, a plane on which a lens of the glasses is located is equivalent to a rectangular plane perpendicular to a horizontal plane, wherein the rectangular plane comprises two long edges and two short edges, a long edge of the lens of the glasses is considered as an x-axis, a short edge of the lens of the glasses is considered as a y-axis, and a line that is perpendicular to an xy plane constituted by the x-axis and the y-axis is a z-axis; and the first plane is parallel with the plane formed by the x-axis and the y-axis.

9. The near-eye display according to claim 1, wherein the near-eye display further comprises a processor and a memory storing a program to be executed in the processor, the program comprising instructions to
control the pixel display to output, by the scanning, the multiple groups of pixels in each frame of image; and
control the semi-reflector that corresponds to the group of pixels output by the pixel display to be activated.

10. The near-eye display according to claim 9, wherein the near-eye display further comprises a beam splitter and a photoreceptor array;
the beam splitter is configured to reflect, onto the photoreceptor array, light reflected by the eyeball;
the photoreceptor array generates corresponding data according to the light reflected by the beam splitter and stores the data; and
the program comprises further instructions for detecting the eyeball according to the data stored in the photoreceptor array, and executing a corresponding operation action according to a detection result.

11. The near-eye display according to claim 1, wherein the pixel display is configured to display, in a manner of outputting parallel light, the multiple groups of pixels, in each frame of image, that are output by the scanning.

12. A near-eye display comprising:
a pixel display configured to display multiple groups of pixels, in each frame of image, that are output by scanning, wherein each group of pixels comprises multiple pixel subunits, and each pixel subunit comprises at least one pixel; and
multiple semi-reflectors, wherein each of the semi-reflectors is in a one-to-one correspondence with each group of pixels displayed by the pixel display, each of the semi-reflectors comprises multiple inner platings that are disposed at different reflection angles, each inner plating is in a one-to-one correspondence with each pixel subunits that is in a group of pixels corresponding to a semi-reflector in which the inner plating is located, and
wherein each of the semi-reflectors is configured to be activated when the group of pixels corresponding to the semi-reflector is activated, and is configured to reflect light emitted from each pixel subunit which is in an one-to-one correspondence with each inner plating to a direction of an eyeball center by using all the inner platings comprised in the semi-reflector,
wherein each frame of image is output by column scanning, and each group of pixels is in one column, and
wherein a quantity of the multiple semi-reflectors is equal to a quantity of columns of each frame of image.

13. A near-eye display device comprising:
a pixel display configured to display multiple groups of pixels, in each frame of image, that are output by scanning, wherein each group of pixels comprises multiple pixel subunits, and each pixel subunit comprises at least one pixel; and
multiple semi-reflectors, wherein each of the semi-reflectors is in a one-to-one correspondence with each group of pixels displayed by the pixel display, each of the semi-reflectors comprises multiple inner platings that are disposed at different reflection angles, each inner plating is in a one-to-one correspondence with each pixel subunits that is in a group of pixels corresponding to a semi-reflector in which the inner plating is located, and
wherein each of the semi-reflectors is configured to be activated when the group of pixels corresponding to the semi-reflector is activated, and is configured to reflect light emitted from each pixel subunit which is in an one-to-one correspondence with each inner plating to a direction of an eyeball center by using all the inner platings comprised in the semi-reflector;
the semi-reflector is substantially in a shape of a long strip, and the multiple inner platings are arranged along a length direction of the long strip;
in an active state, the activated semi-reflector is configured to move by a distance along the width direction of the long strip.

14. The near-eye display according to claim 13, wherein an angle of a light ray that is projected by the multiple semi-reflectors onto a human eye covers an entire area in which a light ray can be received of an eyeball, and a horizontal angle and a pitch angle that are formed by the light ray projected onto the human eye are respectively greater than or equal to a maximum horizontal angle and a maximum pitch angle that are of a field of view of the human eye.

15. The near-eye display according to claim 13, wherein the pixel display comprises
a first side pixel display and a second side pixel display, wherein the first side pixel display is configured to display a first subset of the multiple groups of pixels that are located on a first side of the image, the second side pixel display is configured to display a second subset of the multiple groups of pixels that are located on a second side of the image, and in each frame of image, the first subset of the multiple groups of pixels located on the first side of the image and the second subset of the multiple groups of pixels located on the second side of the image constitute a frame of image;
the multiple semi-reflectors comprise multiple first side semi-reflectors and multiple second side semi-reflectors, wherein the multiple first side semi-reflectors separately correspond to the first subset of the multiple groups of pixels displayed by the first side pixel display, and the multiple second side semi-reflectors separately correspond to the second subset of the multiple groups of pixels displayed by the second side pixel display;
the near-eye display further comprises: a reflecting prism, configured to reflect a group of pixels displayed by the second side pixel display;
each semi-reflector of the multiple first side semi-reflectors is configured to be activated when a group of pixels displayed by the first side pixel display is activated, and is configured to reflect light emitted from the group of displayed pixels onto the eye by using the inner platings after each semi-reflector of the multiple first side semi-reflectors is activated; and
each semi-reflector of the multiple second side semi-reflectors is configured to be activated when a group of pixels displayed by the second side pixel display is activated, and reflect light emitted from the group of pixels displayed by the second side pixel display, to the direction of the eyeball center by using the inner platings after light emitted from the group of pixels is reflected through the reflecting prism.

16. The near-eye display according to claim 15, wherein the first side pixel display is a left side pixel display, and the second side pixel display is a right side pixel display;
when the first side pixel display is configured to display the first subset of the multiple groups of pixels that are output by column scanning and that are located on a left side of the image; and when the second side pixel display is configured to display the second subset of the multiple groups of pixels that are output by column scanning and that are located on a right side of the image.

17. The near-eye display according to claim 13, wherein the pixel display outputs the multiple groups of pixels in each frame of image by column scanning, and each group of pixels is one or more columns of pixels;

when each group of pixels is a column of pixels, a quantity of the inner platings in each semi-reflector is equal to a quantity of pixels in the column of pixels, and each inner plating separately corresponds to each pixel in the column of pixels; or when each group of pixels is multiple columns of pixels, a quantity of the inner platings in each semi-reflector is equal to a quantity of pixels in one column of pixels, and each inner plating separately corresponds to multiple pixels in each row in the multiple columns of pixels; or when each group of pixels is multiple columns of pixels, a quantity of the inner platings in each semi-reflector is equal to a quantity of pixels in the multiple columns of pixels, and each inner plating is in a one-to-one correspondence with each pixel of the multiple columns of pixels.

18. The near-eye display according to claim 13, wherein each semi-reflector, of the multiple semi-reflectors, that is at an inactive position does not block light emitted to an activated semi-reflector.

19. The near-eye display according to claim 13, wherein the semi-reflector is in a shape of a long strip and thin plate, when each semi-reflector of the multiple semi-reflectors is inactive, the reflector and another reflector are stacked in a thickness direction to form a cube, and a second plane formed by the cube in the thickness direction is parallel with a plane constituted by light rays that are formed by a group of pixels displayed by the pixel display.

20. The near-eye display according to claim 19, wherein in an active state, the activated semi-reflector is configured to move by a distance along a width direction of the long strip;

when glasses are normally worn, a plane on which a lens of the glasses is located is equivalent to a rectangular plane perpendicular to a horizontal plane, wherein the rectangular plane comprises two long edges and two short edges, a long edge of the lens of the glasses is considered as an x-axis, a short edge of the lens of the glasses is considered as a y-axis, and a line that is perpendicular to an xy plane constituted by the x-axis and the y-axis is a z-axis; and the second plane is parallel with the plane formed by the x-axis and the y-axis.

* * * * *